US012569802B2

(12) United States Patent
Ho et al.

(10) Patent No.: US 12,569,802 B2
(45) Date of Patent: Mar. 10, 2026

(54) GUANIDINE-CONTAINING MEMBRANES AND METHODS OF USING THEREOF

(71) Applicant: Ohio State Innovation Foundation, Columbus, OH (US)

(72) Inventors: W.S. Winston Ho, Columbus, OH (US); Yang Han, Columbus, OH (US)

(73) Assignee: Ohio State Innovation Foundation, Columbus, OH (US)

(*) Notice: Subject to any disclaimer, the term of this patent is extended or adjusted under 35 U.S.C. 154(b) by 983 days.

(21) Appl. No.: 17/615,503

(22) PCT Filed: Jun. 1, 2020

(86) PCT No.: PCT/IB2020/055179

§ 371 (c)(1),
(2) Date: Nov. 30, 2021

(87) PCT Pub. No.: WO2020/240522

PCT Pub. Date: Dec. 3, 2020

(65) Prior Publication Data

US 2022/0305436 A1 Sep. 29, 2022

Related U.S. Application Data

(60) Provisional application No. 62/855,368, filed on May 31, 2019.

(51) Int. Cl.
*B01D 53/22* (2006.01)
*B01D 69/02* (2006.01)
(Continued)

(52) U.S. Cl.
CPC ........... *B01D 53/228* (2013.01); *B01D 69/02* (2013.01); *B01D 69/10* (2013.01); *B01D 69/12* (2013.01);
(Continued)

(58) Field of Classification Search
None
See application file for complete search history.

(56) References Cited

U.S. PATENT DOCUMENTS

| | | | |
|---|---|---|---|
| 2015/0059578 A1 | 3/2015 | Huizing et al. |
| 2017/0056839 A1 | 3/2017 | Ho et al. |

FOREIGN PATENT DOCUMENTS

| | | |
|---|---|---|
| WO | 2018/085377 A1 | 5/2018 |
| WO | 2020/087067 A1 | 4/2020 |

OTHER PUBLICATIONS

Timin et al., "Magnetic silica hybrids modified with guanidine containing co-polymers for drug delivery applications." Materials Science and Engineering C 64 (2016) 20-28.*
(Continued)

*Primary Examiner* — Daniel Berns
(74) *Attorney, Agent, or Firm* — Meunier Carlin & Curfman LLC

(57) ABSTRACT

Membranes, methods of making the membranes, and methods of using the membranes are described herein. The membrane can comprise a support layer; and a selective polymer layer disposed (e.g., coated) on the support layer. The selective polymer layer can comprise a polymer matrix (e.g., a hydrophilic polymer, an amine-containing polymer, or a combination thereof), and a guanidine-based mobile carrier dispersed within the polymer matrix. Optionally, the selective polymer later can further include an amine-based mobile carrier, a $CO_2$-philic ether, a graphene oxide, carbon nanotubes, or a combination thereof, dispersed within the polymer matrix. The membranes can be used to separate carbon dioxide from other gases, such as hydrogen and/or nitrogen. Also provided are methods of separating gas streams using the membranes described herein.

20 Claims, 5 Drawing Sheets

Guanidines

TMG

PZC

*N*-(alkylamine)TMG

*N*-(alkanol)TMG

(51) Int. Cl.

*B01D 69/10* (2006.01)
*B01D 69/12* (2006.01)
*B01D 69/14* (2006.01)
*B01D 71/02* (2006.01)
*B01D 71/44* (2006.01)
*B01D 71/60* (2006.01)
*B01D 71/68* (2006.01)

(52) U.S. Cl.

CPC ......... *B01D 69/141* (2013.01); *B01D 69/142* (2013.01); *B01D 71/021* (2013.01); *B01D 71/441* (2022.08); *B01D 71/60* (2013.01); *B01D 71/68* (2013.01); *B01D 2325/20* (2013.01)

(56) References Cited

OTHER PUBLICATIONS

International Searching Authority (ISA/US). International Search Report and Written Opinion, issued in PCT Application No. PCT/IB2020/055179 on Sep. 3, 2020. 9 pages.

Zhang et al. "Capture and fixation of CO2 promoted by guanidine derivatives." Australian Journal of Chemistry 67.7 (May 16, 2014): 980-988.

V. Andreoni, S. Galmarini, Drivers in $CO_2$ emissions variation: A decomposition analysis for 33 world countries, Energy 103 (2016) 27-37.

J. Black, Cost and Performance Baseline for Fossil Energy Plants: Bituminous Coal and Natural Gas to Electricity Final report, 2nd ed., National Energy Technology Laboratory, 2019.

Y. Chen, B. Wang, L. Zhao, P. Dutta, W.S.W. Ho, New Pebax®/zeolite Y composite membranes for $CO_2$ capture from flue gas, J. Membr. Sci. 495 (2015) 415-423.

W. Yave, A. Car, J. Wind, K.-V. Peinemann, Nanometric thin film membranes manufactured on square meter scale: Ultra-thin films for $CO_2$ capture, Nanotechnology 21 (2010) 395301.

W. Yave, A. Car, S.S. Funari, S.P. Nunes, K.-V. Peinemann, $CO_2$-philic polymer membrane with extremely high separation performance, Macromolecules 43 (2009) 326-333.

Y. Han, W.S.W. Ho, Recent advances in membranes for $CO_2$ capture, Chin. J. Chem. Eng. 26 (2018) 2238-2254.

P. Danckwerts, The reaction of $CO_2$ with ethanolamines, Chem. Eng. Sci. 34 (1979) 443-446.

Y. Han, D. Wu, W.S.W. Ho, Simultaneous effects of temperature and vacuum and feed pressures on facilitated transport membrane for $CO_2/N_2$ separation, J. Membr. Sci. 573 (2019) 476-484.

Y. Han, D. Wu, W.S.W. Ho, Nanotube-reinforced facilitated transport membrane for $CO_2/N_2$ separation with vacuum operation, J. Membr. Sci. 567 (2018) 261-271.

Y. Chen, W.S.W. Ho, High-molecular-weight polyvinylamine/piperazine glycinate membranes for $CO_2$ capture from flue gas, J. Membr. Sci. 514 (2016) 376-384.

Y. Chen, L. Zhao, B. Wang, P. Dutta, W.S.W. Ho, Amine-containing polymer/zeolite Y composite membranes for $CO_2/N_2$ separation, J. Membr. Sci. 497 (2016) 21-28.

Z. Tong, W.S.W. Ho, New sterically hindered polyvinylamine membranes for $CO_2$ separation and capture, J. Membr. Sci. 543 (2017) 202-211.

F.S. Pereira, E. Ribeiro deAzevedo, E.F. da Silva, T.J. Bonagamba, D.L. da Silva Agostíni, A. Magalhaes, A.E. Job, E.R.P. Gonzalez, Study of the carbon dioxide chemical fixation-activation by guanidines, Tetrahedron 64 (2008) 10097-10106.

T. Yamada, P.J. Lukac, T. Yu, R.G. Weiss, Reversible, room-temperature, chiral ionic liquids: Amidinium carbamates derived from amidines and amino-acid esters with carbon dioxide, Chem. Mater. 19 (2007) 4761-4768.

D.J. Heldebrant, P.K. Koech, M.T.C. Ang, C. Liang, J.E. Rainbolt, C.R. Yonker, P.G. Jessop, Reversible zwitterionic liquids, the reaction of alkanol guanidines, alkanol amidines, and diamines with $CO_2$, Green Chemistry 12 (2010) 713-721.

D.J. Heldebrant, C.R. Yonker, P.G. Jessop, L. Phan, Organic liquid $CO_2$ capture agents with high gravimetric $CO_2$ capacity, Energy Environ. Sci. 1 (2008) 487-493.

D. Wu, Y. Han, W. Salim, K.K. Chen, J. Li, W.S.W. Ho, Hydrophilic and morphological modification of nanoporous polyethersulfone substrates for composite membranes in CO2 separation, J. Membr. Sci. 565 (2018) 439-449.

Wilen, S. H., Collet, A., & Jacques, J. (1977). Strategies in optical resolutions. Tetrahedron, 33(21), 2725-2736. doi:10.1016/0040-4020(77)80264-0.

* cited by examiner

Guanidines TMG PZC

*N*-(alkylamine)TMG *N*-(alkanol)TMG

PVAm PVA TMG PZC

PZEA-Sar

GUANIDINE-CONTAINING MEMBRANES AND METHODS OF USING THEREOF

CROSS-REFERENCE TO RELATED APPLICATIONS

This application is a national stage application filed under 35 U.S.C. § 371 of PCT/IB2020/055179 filed Jun. 1, 2020, which claims benefit of priority of U.S. Provisional Application No. 62/855,368, filed May 31, 2019, which is incorporated by reference in its entirety.

STATEMENT OF GOVERNMENT SUPPORT

This invention was made with government support under grant/contract number DE-FE0026919 awarded by the U.S. Department of Energy. The government has certain rights in the invention.

BACKGROUND

There has been growing concern about global warming since the $CO_2$ concentration in the atmosphere has surpassed 400 ppm in the past decade. The combustion of fossil fuels is one of the major contributors to the large amount of $CO_2$ emissions. A variety of strategies for addressing $CO_2$ emissions have been suggested. For example, membranes technologies have been suggested as a promising approach to capture $CO_2$ from large stationary sources. Once captured, the $CO_2$ could be compressed and geologically sequestered. However, improved membranes for the separation of $CO_2$ are needed to successfully implement these solutions.

SUMMARY

Disclosed are membranes that comprise a support layer; and a selective polymer layer disposed (e.g., coated) on the support layer. The selective polymer layer can comprise a polymer matrix and guanidine-based mobile carrier dispersed within the polymer matrix.

In some embodiments, the guanidine-based mobile carrier can have a molecular weight of less than 1,000 Da. In some embodiments, the guanidine-based mobile carrier can be a compound defined by Formula I below Formula I

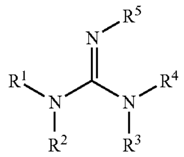

wherein $R^1$ and $R^2$ are each independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups, or $R^1$ and $R^2$, together with the N atom to which they are attached, form a 4-9 membered heterocycloalkyl group or a 5-6 membered heteroaryl group, each optionally substituted with 1, 2, or 3 independently selected $R^A$ groups;

$R^3$ and $R^4$ are each independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups, or $R^3$ and $R^4$, together with the N atom to which they are attached, form a 4-9 membered heterocycloalkyl group or a 5-6 membered heteroaryl group, each optionally substituted with 1, 2, or 3 independently selected $R^A$ groups;

$R^5$ is selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups; and each $R^A$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkyl, HO—$C_{1-3}$ alkyl, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkyl sulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino.

In some embodiments, $R^1$, $R^2$, $R^3$, and $R^4$ are all $C_{1-4}$ alkyl (e.g., methyl).

In some embodiments, $R^5$ is H. In other embodiments, $R^5$ can be $C_{1-6}$ alkyl optionally substituted with 1, 2, 3, or 4 independently selected $R^A$ groups. For example, $R^5$ can be a $C_{1-6}$ alkyl group substituted with an OH group, or a $C_{1-6}$ alkyl group substituted with an amino group.

In some examples, the guanidine-based mobile carrier can comprise one of the following

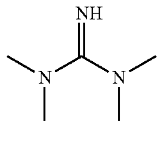

TMG

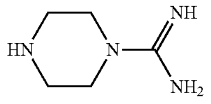

PZC

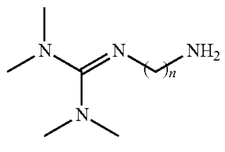

N-(alkylamine)TMG

-continued

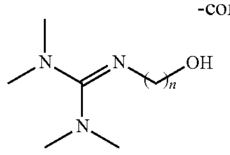

N-(alkanol)TMG wherein n is an integer from 1 to 12, such as from 1 to 6. TMG is tetramethyguanidine, and PZC is piperazine-1-carboximidamide.

The polymer matrix can comprise a hydrophilic polymer, an amine-containing polymer, or a combination thereof. Optionally, the selective polymer matrix can further comprise additional components, such as an amine-based mobile carrier, $CO_2$-philic ether, a graphene oxide, carbon nanotubes, or a combination thereof, dispersed within the polymer matrix.

The gas permeable support layer can comprise a gas permeable polymer. The gas permeable polymer can be a polymer selected from the group consisting of polyamides, polyimides, polypyrrolones, polyesters, sulfone-based polymers, polymeric organosilicones, fluorinated polymers, polyolefins, copolymers thereof, and blends thereof. In some embodiments, the gas permeable polymer comprises polyethersulfone. In certain cases, the gas permeable support layer comprises a gas permeable polymer disposed on a base (e.g., a nonwoven fabric such as a polyester nonwoven).

In some embodiments, the selective polymer layer can comprise an amine-containing polymer (e.g., polyvinylamine), a hydrophilic polymer (e.g., polyvinyl alcohol), a guanidine-based mobile carrier, and an amine-based mobile carrier (e.g., PZEA-Sar, PZEA-AIBA, HEP, or a combination thereof). In some embodiments, the selective polymer layer can comprise an amine-containing polymer (e.g., polyvinylamine), a hydrophilic polymer (e.g., polyvinyl alcohol), a guanidine-based mobile carrier, an amine-based mobile carrier (e.g., PZEA-Sar, PZEA-AIBA, HEP, or a combination thereof), and a $CO_2$-philic ether (e.g., poly(ethylene glycol) dimethyl ether). In some embodiments, the selective polymer layer can comprise an amine-containing polymer (e.g., polyvinylamine), a hydrophilic polymer (e.g., polyvinyl alcohol), a guanidine-based mobile carrier, an amine-based mobile carrier (e.g., PZEA-Sar, PZEA-MBA, HEP, or a combination thereof), and a graphene oxide. In some embodiments, the selective polymer layer can comprise an amine-containing polymer (e.g., polyvinylamine), a hydrophilic polymer (e.g., polyvinyl alcohol), a guanidine-based mobile carrier, an amine-based mobile carrier (e.g., PZEA-Sar, PZEA-AIBA, HEP, or a combination thereof), a $CO_2$-philic ether (e.g., poly(ethylene glycol) dimethyl ether), and a graphene oxide.

The membranes can exhibit selective permeability towards gases, such as carbon dioxide. In certain embodiments, the selective polymer matrix can exhibit a $CO_2$:$N_2$ selectivity of at least 50 (e.g., from 50 to 500) at 77° C. and 4 bar feed pressure.

Also provided are methods for separating a first gas from a feed gas stream using the membranes described herein. These methods can comprise contacting a membrane described herein with the feed gas stream comprising the first gas under conditions effective to afford transmembrane permeation of the first gas. The feed gas can comprise hydrogen, carbon dioxide, hydrogen sulfide, carbon monoxide, nitrogen, methane, steam, sulfur oxides, nitrogen oxides, or combinations thereof.

In some embodiments, the first gas is chosen from carbon dioxide, hydrogen sulfide, and combinations thereof. In some of these embodiments, the feed gas can comprise a second gas selected from the group consisting of nitrogen, hydrogen, carbon monoxide, and combinations thereof, and wherein the membrane exhibits a first gas/second gas selectivity of from 20 to 500 at 77° C. and 4 bar feed pressure.

In certain embodiments, the first gas can comprise carbon dioxide and the second gas can comprise nitrogen.

Also provided are methods of making a membrane that comprise depositing (e.g., coating) a selective polymer layer on a support layer, the selective polymer layer comprising a polymer matrix and guanidine-based mobile carrier dispersed within the polymer matrix.

DETAILED DESCRIPTION

Figure 1:
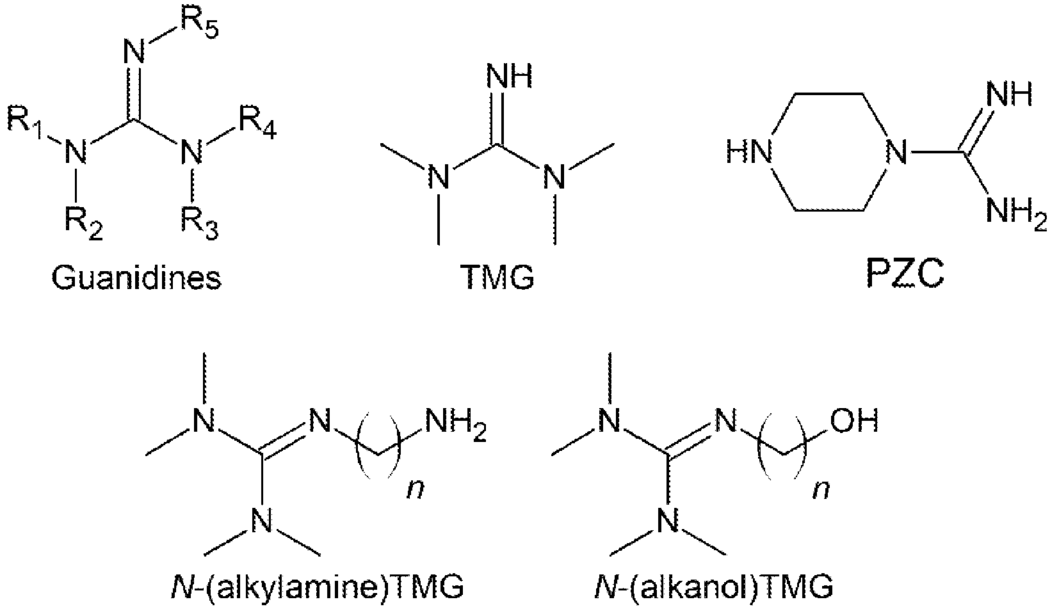
FIG. 1 shows the general structure of a guanidine moiety, as well as several example guanidine-based mobile carriers.

Disclosed herein are membranes that comprise a support layer; and a selective polymer layer disposed (e.g., coated) on the support layer. The selective polymer layer can comprise a polymer matrix and guanidine-based mobile carrier dispersed within the polymer matrix Also provided are methods of making these membranes, and methods of using these membranes.

Definitions

As used in the specification and the appended claims, the singular forms "a," "an" and "the" include plural referents unless the context clearly dictates otherwise. Thus, for example, reference to "a pharmaceutical carrier" includes mixtures of two or more such carriers, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that the throughout the application, data is provided in a number of different formats, and that this data, represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

In this specification and in the claims which follow, reference will be made to a number of terms which shall be defined to have the following meanings:

"Optional" or "optionally" means that the subsequently described event or circumstance may or may not occur, and that the description includes instances where said event or circumstance occurs and instances where it does not.

The term "n-membered" where n is an integer typically describes the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring, and 1,2,3,4-tetrahydro-naphthalene is an example of a 10-membered cycloalkyl group.

As used herein, the phrase "optionally substituted" means unsubstituted or substituted. As used herein, the term "substituted" means that a hydrogen atom is removed and replaced by a substituent. It is to be understood that substitution at a given atom is limited by valency.

Throughout the definitions, the term "$C_{n-m}$" indicates a range which includes the endpoints, wherein n and m are integers and indicate the number of carbons. Examples include $C_{1-4}$, $C_{1-6}$, and the like.

As used herein, the term "$C_{n-m}$ alkyl", employed alone or in combination with other terms, refers to a saturated hydrocarbon group that may be straight-chain or branched, having n to m carbons. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, and the like. In some embodiments, the alkyl group contains from 1 to 6 carbon atoms, from 1 to 4 carbon atoms, from 1 to 3 carbon atoms, or 1 to 2 carbon atoms.

As used herein, "$C_{n-m}$ alkenyl" refers to an alkyl group having one or more double carbon-carbon bonds and having n to m carbons. Example alkenyl groups include, but are not limited to, ethenyl, n-propenyl, isopropenyl, n-butenyl, sec-butenyl, and the like. In some embodiments, the alkenyl moiety contains 2 to 6, 2 to 4, or 2 to 3 carbon atoms.

As used herein, "$C_{n-m}$ alkynyl" refers to an alkyl group having one or more triple carbon-carbon bonds and having n to m carbons. Example alkynyl groups include, but are not limited to, ethynyl, propyn-1-yl, propyn-2-yl, and the like. In some embodiments, the alkynyl moiety contains 2 to 6, 2 to 4, or 2 to 3 carbon atoms.

As used herein, the term "$C_{n-m}$ alkylene", employed alone or in combination with other terms, refers to a divalent alkyl linking group having n to m carbons. Examples of alkylene groups include, but are not limited to, ethan-1,2-diyl, propan-1,3-diyl, propan-1,2-diyl, butan-1,4-diyl, butan-1,3-diyl, butan-1,2-diyl, 2-methyl-propan-1,3-diyl, and the like. In some embodiments, the alkylene moiety contains 2 to 6, 2 to 4, 2 to 3, 1 to 6, 1 to 4, or 1 to 2 carbon atoms.

As used herein, the term "$C_{n-m}$ alkoxy", employed alone or in combination with other terms, refers to a group of formula —O-alkyl, wherein the alkyl group has n to m carbons. Example alkoxy groups include methoxy, ethoxy, propoxy (e.g., n-propoxy and isopropoxy), tert-butoxy, and the like. In some embodiments, the alkyl group has 1 to 6, 1 to 4, or 1 to 3 carbon atoms.

As used herein, the term "$C_{n-m}$ alkylamino" refers to a group of formula —NH(alkyl), wherein the alkyl group has n to m carbon atoms. In some embodiments, the alkyl group has 1 to 6, 1 to 4, or 1 to 3 carbon atoms.

As used herein, the term "$C_{n-m}$ alkoxycarbonyl" refers to a group of formula —C(O)O-alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylcarbonyl" refers to a group of formula —C(O)— alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylcarbonylamino" refers to a group of formula —NHC(O)-alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylsulfonylamino" refers to a group of formula —$NHS(O)_2$-alkyl, wherein the alkyl group has n to m carbon atoms. In some embodiments, the alkyl group has 1 to 6, 1 to 4, or 1 to 3 carbon atoms.

As used herein, the term "aminosulfonyl" refers to a group of formula —$S(O)_2NH_2$.

As used herein, the term "$C_{n-m}$ alkylaminosulfonyl" refers to a group of formula —$S(O)_2NH$(alkyl), wherein the alkyl group has n to m carbon atoms. In some embodiments, the alkyl group has 1 to 6, 1 to 4, or 1 to 3 carbon atoms.

As used herein, the term "di($C_{n-m}$ alkyl)aminosulfonyl" refers to a group of formula —$S(O)_2N(alkyl)_2$, wherein each alkyl group independently has n to m carbon atoms.

In some embodiments, each alkyl group has, independently, 1 to 6, 1 to 4, or 1 to 3 carbon atoms.

As used herein, the term "aminosulfonylamino" refers to a group of formula —$NHS(O)_2NH_2$.

As used herein, the term "$C_{n-m}$ alkylaminosulfonylamino" refers to a group of formula —$NHS(O)_2NH$(alkyl), wherein the alkyl group has n to m carbon atoms. In some embodiments, the alkyl group has 1 to 6, 1 to 4, or 1 to 3 carbon atoms.

As used herein, the term "di($C_{n-m}$ alkyl)aminosulfonylamino" refers to a group of formula —$NHS(O)_2N(alkyl)_2$, wherein each alkyl group independently has n to m carbon atoms. In some embodiments, each alkyl group has, independently, 1 to 6, 1 to 4, or 1 to 3 carbon atoms.

As used herein, the term "aminocarbonylamino", employed alone or in combination with other terms, refers to a group of formula —$NHC(O)NH_2$.

As used herein, the term "$C_{n-m}$ alkylaminocarbonylamino" refers to a group of formula —NHC(O)NH (alkyl), wherein the alkyl group has n to m carbon atoms. In some embodiments, the alkyl group has 1 to 6, 1 to 4, or 1 to 3 carbon atoms.

As used herein, the term "di($C_{n-m}$ alkyl)aminocarbonylamino" refers to a group of formula —NHC(O)N(alkyl)$_2$, wherein each alkyl group independently has n to m carbon atoms. In some embodiments, each alkyl group has, independently, 1 to 6, 1 to 4, or 1 to 3 carbon atoms.

As used herein, the term "$C_{n-m}$ alkylcarbamyl" refers to a group of formula —C(O)—NH(alkyl), wherein the alkyl group has n to m carbon atoms. In some embodiments, the alkyl group has 1 to 6, 1 to 4, or 1 to 3 carbon atoms.

As used herein, the term "thio" refers to a group of formula —SH.

As used herein, the term "$C_{n-m}$ alkylsulfinyl" refers to a group of formula —S(O)— alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylsulfonyl" refers to a group of formula —S(O)$_2$— alkyl, wherein the alkyl group has n to m carbon atoms. In some embodiments, the alkyl group has 1 to 6, 1 to 4, or 1 to 3 carbon atoms.

As used herein, the term "amino" refers to a group of formula —$NH_2$.

As used herein, the term "aryl," employed alone or in combination with other terms, refers to an aromatic hydrocarbon group, which may be monocyclic or polycyclic (e.g., having 2, 3 or 4 fused rings). The term "$C_{n-m}$ aryl" refers to an aryl group having from n to m ring carbon atoms. Aryl groups include, e.g., phenyl, naphthyl, anthracenyl, phenanthrenyl, indanyl, indenyl, and the like. In some embodiments, aryl groups have from 6 to about 20 carbon atoms, from 6 to about 15 carbon atoms, or from 6 to about 10 carbon atoms. In some embodiments, the aryl group is a substituted or unsubstituted phenyl.

As used herein, the term "carbamyl" to a group of formula —C(O)$NH_2$.

As used herein, the term "carbonyl", employed alone or in combination with other terms, refers to a —C(═O)— group, which may also be written as C(O).

As used herein, the term "di($C_{n-m}$-alkyl)amino" refers to a group of formula —N(alkyl)$_2$, wherein the two alkyl groups each has, independently, n to m carbon atoms. In some embodiments, each alkyl group independently has 1 to 6, 1 to 4, or 1 to 3 carbon atoms.

As used herein, the term "di($C_{n-m}$-alkyl)carbamyl" refers to a group of formula —C(O)N(alkyl)$_2$, wherein the two alkyl groups each has, independently, n to m carbon atoms. In some embodiments, each alkyl group independently has 1 to 6, 1 to 4, or 1 to 3 carbon atoms.

As used herein, the term "halo" refers to F, Cl, Br, or I. In some embodiments, a halo is F, Cl, or Br. In some embodiments, a halo is F or Cl.

As used herein, "$C_{n-m}$ haloalkoxy" refers to a group of formula —O-haloalkyl having n to m carbon atoms. An example haloalkoxy group is $OCF_3$. In some embodiments, the haloalkoxy group is fluorinated only. In some embodiments, the alkyl group has 1 to 6, 1 to 4, or 1 to 3 carbon atoms.

As used herein, the term "$C_{n-m}$ haloalkyl", employed alone or in combination with other terms, refers to an alkyl group having from one halogen atom to 2s+1 halogen atoms which may be the same or different, where "s" is the number of carbon atoms in the alkyl group, wherein the alkyl group has n to m carbon atoms. In some embodiments, the haloalkyl group is fluorinated only. In some embodiments, the alkyl group has 1 to 6, 1 to 4, or 1 to 3 carbon atoms.

As used herein, "cycloalkyl" refers to non-aromatic cyclic hydrocarbons including cyclized alkyl and/or alkenyl groups. Cycloalkyl groups can include mono- or polycyclic (e.g., having 2, 3 or 4 fused rings) groups and spirocycles. Cycloalkyl groups can have 3, 4, 5, 6, 7, 8, 9, or 10 ring-forming carbons ($C_{3-10}$). Ring-forming carbon atoms of a cycloalkyl group can be optionally substituted by oxo or sulfido (e.g., C(O) or C(S)). Cycloalkyl groups also include cycloalkylidenes. Example cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, and the like. In some embodiments, cycloalkyl is cyclopropyl, cyclobutyl, cyclopentyl, cyclohexyl, cyclopentyl, or adamantyl. In some embodiments, the cycloalkyl has 6-10 ring-forming carbon atoms. In some embodiments, cycloalkyl is adamantyl. Also included in the definition of cycloalkyl are moieties that have one or more aromatic rings fused (i.e., having a bond in common with) to the cycloalkyl ring, for example, benzo or thienyl derivatives of cyclopentane, cyclohexane, and the like. A cycloalkyl group containing a fused aromatic ring can be attached through any ring-forming atom including a ring-forming atom of the fused aromatic ring.

As used herein, "heteroaryl" refers to a monocyclic or polycyclic aromatic heterocycle having at least one heteroatom ring member selected from sulfur, oxygen, and nitrogen. In some embodiments, the heteroaryl ring has 1, 2, 3, or 4 heteroatom ring members independently selected from nitrogen, sulfur and oxygen. In some embodiments, any ring-forming N in a heteroaryl moiety can be an N-oxide. In some embodiments, the heteroaryl has 5-10 ring atoms and 1, 2, 3 or 4 heteroatom ring members independently selected from nitrogen, sulfur and oxygen. In some embodiments, the heteroaryl has 5-6 ring atoms and 1 or 2 heteroatom ring members independently selected from nitrogen, sulfur and oxygen. In some embodiments, the heteroaryl is a five-membered or six-membered heteroaryl ring. A five-membered heteroaryl ring is a heteroaryl with a ring having five ring atoms wherein one or more (e.g., 1, 2, or 3) ring atoms are independently selected from N, O, and S. Exemplary five-membered ring heteroaryls are thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl. A six-membered heteroaryl ring is a heteroaryl with a ring having six ring atoms wherein one or more (e.g., 1, 2, or 3) ring atoms are independently selected from N, O, and S. Exemplary six-membered ring heteroaryls are pyridyl, pyrazinyl, pyrimidinyl, triazinyl and pyridazinyl.

As used herein, "heterocycloalkyl" refers to non-aromatic monocyclic or polycyclic heterocycles having one or more ring-forming heteroatoms selected from O, N, or S. Included in heterocycloalkyl are monocyclic 4-, 5-, 6-, and 7-membered heterocycloalkyl groups. Heterocycloalkyl groups can also include spirocycles. Example heterocycloalkyl groups include pyrrolidin-2-one, 1,3-isoxazolidin-2-one, pyranyl, tetrahydropuran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazapene, and the like. Ring-forming carbon atoms and heteroatoms of a heterocycloalkyl group can be optionally substituted by oxo or sulfido (e.g., C(O), S(O), C(S), or S(O)$_2$, etc.). The heterocycloalkyl group can be attached through a ring-forming carbon atom or a ring-forming heteroatom. In some embodiments, the heterocycloalkyl group contains 0 to 3 double bonds. In some embodiments, the heterocycloalkyl group contains 0 to 2 double bonds. Also included in the definition of heterocycloalkyl are moieties that have one or more aromatic rings fused (i.e., having a bond in common with) to the cycloalkyl ring, for example, benzo or thienyl derivatives of piperidine, morpholine, azepine, etc. A heterocycloalkyl group containing a fused aromatic ring can be attached through any ring-forming atom including a ring-forming atom of the fused aromatic ring. In some embodiments, the heterocycloalkyl has 4-10, 4-7 or 4-6 ring atoms with 1 or 2 heteroatoms independently selected from nitrogen, oxygen, or sulfur and having one or more oxidized ring members.

At certain places, the definitions or embodiments refer to specific rings (e.g., an azetidine ring, a pyridine ring, etc.). Unless otherwise indicated, these rings can be attached to any ring member provided that the valency of the atom is not exceeded. For example, an azetidine ring may be attached at any position of the ring, whereas a pyridin-3-yl ring is attached at the 3-position.

The term “compound” as used herein is meant to include all stereoisomers, geometric isomers, tautomers, and isotopes of the structures depicted. Compounds herein identified by name or structure as one particular tautomeric form are intended to include other tautomeric forms unless otherwise specified.

Compounds provided herein also include tautomeric forms. Tautomeric forms result from the swapping of a single bond with an adjacent double bond together with the concomitant migration of a proton. Tautomeric forms include prototropic tautomers which are isomeric protonation states having the same empirical formula and total charge. Example prototropic tautomers include ketone-enol pairs, amide-imidic acid pairs, lactam-lactim pairs, enamine-imine pairs, and annular forms where a proton can occupy two or more positions of a heterocyclic system, for example, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution.

In some embodiments, the compounds described herein can contain one or more asymmetric centers and thus occur as racemates and racemic mixtures, enantiomerically enriched mixtures, single enantiomers, individual diastereomers and diastereomeric mixtures (e.g., including (R)- and (S)-enantiomers, diastereomers, (D)-isomers, (L)-isomers, (+) (dextrorotatory) forms, (−) (levorotatory) forms, the racemic mixtures thereof, and other mixtures thereof). Additional asymmetric carbon atoms can be present in a substituent, such as an alkyl group. All such isomeric forms, as well as mixtures thereof, of these compounds are expressly included in the present description. The compounds described herein can also or further contain linkages wherein bond rotation is restricted about that particular linkage, e.g. restriction resulting from the presence of a ring or double bond (e.g., carbon-carbon bonds, carbon-nitrogen bonds such as amide bonds). Accordingly, all cis/trans and E/Z isomers and rotational isomers are expressly included in the present description. Unless otherwise mentioned or indicated, the chemical designation of a compound encompasses the mixture of all possible stereochemically isomeric forms of that compound.

Optical isomers can be obtained in pure form by standard procedures known to those skilled in the art, and include, but are not limited to, diastereomeric salt formation, kinetic resolution, and asymmetric synthesis. See, for example, Jacques, et al., Enantiomers, Racemates and Resolutions (Wiley Interscience, New York, 1981); Wilen, S. H., et al., Tetrahedron 33:2725 (1977); Eliel, E. L. Stereochemistry of Carbon Compounds (McGraw-Hill, NY, 1962); Wilen, S. H. Tables of Resolving Agents and Optical Resolutions p. 268 (E. L. Eliel, Ed., Univ. of Notre Dame Press, Notre Dame, IN 1972), each of which is incorporated herein by reference in their entireties. It is also understood that the compounds described herein include all possible regioisomers, and mixtures thereof, which can be obtained in pure form by standard separation procedures known to those skilled in the art, and include, but are not limited to, column chromatography, thin-layer chromatography, and high-performance liquid chromatography.

Support Layer

The support layer can be formed from any suitable material. The material used to form the support layer can be chosen based on the end use application of the membrane. In some embodiments, the support layer can comprise a gas permeable polymer. The gas permeable polymer can be a cross-linked polymer, a phase separated polymer, a porous condensed polymer, or a blend thereof. Examples of suitable gas permeable polymers include polyamides, polyimides, polypyrrolones, polyesters, sulfone-based polymers, nitrile-based polymers, polymeric organosilicones, fluorinated polymers, polyolefins, copolymers thereof, or blends thereof. Specific examples of polymers that can be present in the support layer include polydimethylsiloxane, polydiethylsiloxane, polydi-iso-propylsiloxane, polydiphenylsiloxane, polyethersulfone, polyphenylsulfone, polysulfone, polyacrylonitrile, polyvinylidene fluoride, polyamide, polyimide, polyetherimide, polyetheretherketone, polyphenylene oxide, polybenzimidazole, polypropylene, polyethylene, partially fluorinated, perfluorinated or sulfonated derivatives thereof, copolymers thereof, or blends thereof. In some embodiments, the gas permeable polymer can be polysulfone or polyethersulfone. If desired, the support layer can include inorganic particles to increase the mechanical strength without altering the permeability of the support layer.

In certain embodiments, the support layer can comprise a gas permeable polymer disposed on a base. The base can be in any configuration configured to facilitate formation of a membrane suitable for use in a particular application. For example, the base can be a flat disk, a tube, a spiral wound, or a hollow fiber base. The base can be formed from any suitable material. In some embodiments, the layer can include a fibrous material. The fibrous material in the base can be a mesh (e.g., a metal or polymer mesh), a woven or non-woven fabric, a glass, fiberglass, a resin, a screen (e.g., a metal or polymer screen). In certain embodiments, the base can include a non-woven fabric (e.g., a non-woven fabric comprising fibers formed from a polyester).

Selective Polymer Layer

The selective polymer layer can comprise a polymer matrix and guanidine-based mobile carrier dispersed within the polymer matrix.

The polymer matrix can comprise a hydrophilic polymer, an amine-containing polymer, or a combination thereof. Optionally, the selective polymer matrix can further comprise additional components, such as an amine-based mobile carrier, $CO_2$-philic ether, a graphene oxide, carbon nanotubes, or a combination thereof, dispersed within the polymer matrix.

By way of example, in some embodiments, the selective polymer layer can comprise an amine-containing polymer (e.g., polyvinylamine), a hydrophilic polymer (e.g., polyvinyl alcohol), a guanidine-based mobile carrier, and an amine-based mobile carrier (e.g., 2-(1-piperazineyl)ethylamine sarcosinate (PZEA-Sar), 2-(1-piperazineyl)ethylamine 2-aminoisobutyrate (PZEA-AIBA), 1-(2-hydroxyethyl)

piperazine (HEP), or a combination thereof). In some embodiments, the selective polymer layer can comprise an amine-containing polymer (e.g., polyvinylamine), a hydrophilic polymer (e.g., polyvinyl alcohol), a guanidine-based mobile carrier, an amine-based mobile carrier (e.g., PZEA-Sar, PZEA-AIBA, HEP, or a combination thereof), and a $CO_2$-philic ether (e.g., poly(ethylene glycol) dimethyl ether). In some embodiments, the selective polymer layer can comprise an amine-containing polymer (e.g., polyvinylamine), a hydrophilic polymer (e.g., polyvinyl alcohol), a guanidine-based mobile carrier, an amine-based mobile carrier (e.g., PZEA-Sar, PZEA-AIBA, HEP, or a combination thereof), and a graphene oxide. In some embodiments, the selective polymer layer can comprise an amine-containing polymer (e.g., polyvinylamine), a hydrophilic polymer (e.g., polyvinyl alcohol), a guanidine-based mobile carrier, an amine-based mobile carrier (e.g., PZEA-Sar, PZEA-AIBA, HEP, or a combination thereof), a $CO_2$-philic ether (e.g., poly(ethylene glycol) dimethyl ether), and a graphene oxide.

In some cases, the selective polymer layer can be a polymer matrix through which gas permeates via diffusion or facilitated diffusion. The selective polymer layer can comprise a polymer matrix having a $CO_2$:$N_2$ selectivity of at least 10 at 77° C. and 4 bar feed pressure. For example, the polymer matrix can have a $CO_2$:$N_2$ selectivity of at least 25 (e.g., at least 50, at least 75, at least 100, at least 125, at least 150, at least 175, at least 200, at least 225, at least 250, at least 275, at least 300, at least 325, at least 350, at least 375, at least 400, at least 425, at least 450, or at least 475) at 77° C. and 4 bar feed pressure. In some embodiments, the polymer matrix can have a $CO_2$:$N_2$ selectivity of 500 or less (e.g., 475 or less, 450 or less, 425 or less, 400 or less, 375 or less, 350 or less, 325 or less, 300 or less, 275 or less, 250 or less, 225 or less, 200 or less, 175 or less, 150 or less, 125 or less, 100 or less, 75 or less, 50 or less, or 25 or less) at 77° C. and 4 bar feed pressure.

In certain embodiments, the selective polymer layer can comprise a polymer matrix that has a $CO_2$:$N_2$ selectivity ranging from any of the minimum values described above to any of the maximum values described above. For example, in certain embodiments, the selective polymer layer can comprise a polymer matrix that has a $CO_2$:$N_2$ selectivity of from 10 to 500 at 77° C. and 4 bar feed pressure (e.g., from 10 to 400 at 77° C. and 4 bar feed pressure, from 75 to 400 at 77° C. and 4 bar feed pressure, from 100 to 400 at 77° C. and 4 bar feed pressure, from 10 to 350 at 77° C. and 4 bar feed pressure, from 75 to 350 at 77° C. and 4 bar feed pressure, from 100 to 350 at 77° C. and 4 bar feed pressure, from 10 to 250 at 77° C. and 4 bar feed pressure, from 75 to 250 at 77° C. and 4 bar feed pressure, or from 100 to 250 at 77° C. and 4 bar feed pressure). The $CO_2$:$N_2$ selectivity of the selective polymer can be measured using standard methods for measuring gas permeance known in the art, such as those described in the examples below.

Polymer Matrix

The polymer matrix can include a hydrophilic polymer, an amine-containing polymer, or a combination thereof. In certain embodiments, the polymer matrix can include a hydrophilic polymer. In certain embodiments, the polymer matrix can include an amine-containing polymer. In certain embodiments, the polymer matrix can include a hydrophilic polymer and an amine-containing polymer.

When present, the hydrophilic polymer can include any suitable hydrophilic polymer. Examples of hydrophilic polymers suitable for use in the selective polymer layer can include polyvinylalcohol, polyvinylacetate, polyethylene oxide, polyvinylpyrrolidone, polyacrylamine, a polyamine such as polyallylamine, polyvinylamine, or polyethylenimine, copolymers thereof, and blends thereof. In some embodiments, the hydrophilic polymer includes polyvinylalcohol.

When present, the hydrophilic polymer can have any suitable molecular weight. For example, the hydrophilic polymer can have a weight average molecular weight of from 15,000 Da to 2,000,000 Da (e.g., from 50,000 Da to 200,000 Da). In some embodiments, the hydrophilic polymer can include polyvinylalcohol having a weight average molecular weight of from 50,000 Da to 150,000 Da. In other embodiments, the hydrophilic polymer can be a high molecular weight hydrophilic polymer. For example, the hydrophilic polymer can have a weight average molecular weight of at least 500,000 Da (e.g., at least 700,000 Da, or at least 1,000,000 Da).

The selective polymer layer can comprise any suitable amount of the hydrophilic polymer. For example, in some cases, the selective polymer layer can comprise from 10% to 90% by weight (e.g., from 10% to 50% by weight, or from 10% to 30% by weight) hydrophilic polymer, based on the total weight of the components used to form the selective polymer layer.

The polymer matrix can also include an amine-containing polymer (also referred to herein as a "fixed carrier" or a "fixed-site carrier"). When present, the amine-containing polymer can have any suitable molecular weight. For example, the amine-containing polymer can have a weight average molecular weight of from 5,000 Da to 5,000,000 Da, or from 50,000 Da to 2,000,000 Da.

Suitable examples of amine-containing polymers include, but are not limited to, polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof. In some embodiments, the amine-containing polymer can comprise polyvinylamine (e.g., polyvinylamine having a weight average molecular weight of from 50,000 Da to 2,000,000 Da).

The selective polymer layer can comprise any suitable amount of the amine-containing polymer. For example, in some cases, the selective polymer layer can comprise from 10% to 90% by weight (e.g., from 10% to 50% by weight, or from 10% to 30% by weight) amine-containing polymer, based on the total weight of the components used to form the selective polymer layer.

Guanidine-Based Mobile Carrier

The guanidine-based mobile carrier can comprise any suitable compound comprising a guanidine moiety and having a molecular weight of less than 1,000 Da (e.g., 800 Da or less, 500 or less, 300 Da or less, or 250 Da or less). In some embodiments, the guanidine-based mobile carrier can be a water-soluble compound. In some embodiments, the guanidine-containing mobile carrier can be non-volatile at the temperatures at which the membrane will be stored or used.

In some embodiments, the guanidine-based mobile carrier can be a compound defined by Formula I below Formula I

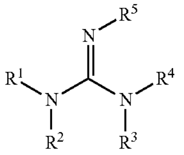

wherein $R^1$ and $R^2$ are each independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups, or $R^1$ and $R^2$, together with the N atom to which they are attached, form a 4-9 membered heterocycloalkyl group or a 5-6 membered heteroaryl group, each optionally substituted with 1, 2, or 3 independently selected $R^A$ groups;

$R^3$ and $R^4$ are each independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups, or $R^3$ and $R^4$, together with the N atom to which they are attached, form a 4-9 membered heterocycloalkyl group or a 5-6 membered heteroaryl group, each optionally substituted with 1, 2, or 3 independently selected $R^A$ groups;

$R^5$ is selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups; and each $R^A$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkyl, HO—$C_{1-3}$ alkyl, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkyl sulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino.

In some embodiments, $R^1$, $R^2$, $R^3$, and $R^4$ are all $C_{1-4}$ alkyl (e.g., methyl).

In some embodiments, $R^5$ is H. In other embodiments, $R^5$ can be $C_{1-6}$ alkyl optionally substituted with 1, 2, 3, or 4 independently selected $R^A$ groups. For example, $R^5$ can be a $C_{1-6}$ alkyl group substituted with an OH group, or a $C_{1-6}$ alkyl group substituted with an amino group.

In some examples, the guanidine-based mobile carrier can comprise one of the following

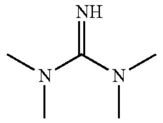

TMG

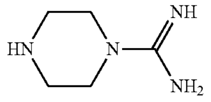

PZC

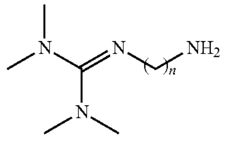

N-(alkylamine)TMG

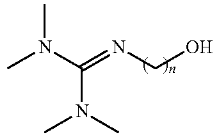

N-(alkanol)TMG wherein n is an integer from 1 to 12, such as from 1 to 6. TMG is tetramethyguanidine, and PZC is piperazine-1-carboximidamide.

Amine-Containing Mobile Carrier

Suitable amine-containing mobile carriers can include small molecules comprising one or more primary amine moieties and/or one or more secondary amine moieties, such as an amino acid salt, that can serve as a "mobile carrier" for $CO_2$ within the polymer matrix.

In some embodiments, the amine-containing mobile carrier can have a molecular weight of 1,000 Da or less (e.g., 800 Da or less, 500 or less, 300 Da or less, or 250 Da or less). In some embodiments, the amine-containing mobile carrier can be non-volatile at the temperatures at which the membrane will be stored or used. For example, amine-containing mobile carrier can comprise a salt of a primary amine or a salt of a secondary amine.

In some cases, the amine-containing mobile carrier can include an aminoacid salt. The amino acid salt can be a salt of any suitable amino acid. The amino acid salt may be derived, for instance, from glycine, arginine, lysine, histidine, 6-aminohexanoic acid, proline, sarcosine, methionine, or taurine. In some cases, the amino acid salt can comprise a salt of a compound defined by the formula below

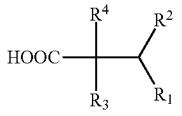

Wherein, independently for each occurrence in the amino acid, each of $R_1$, $R_2$, $R_3$ and $R_4$ is selected from one of the following

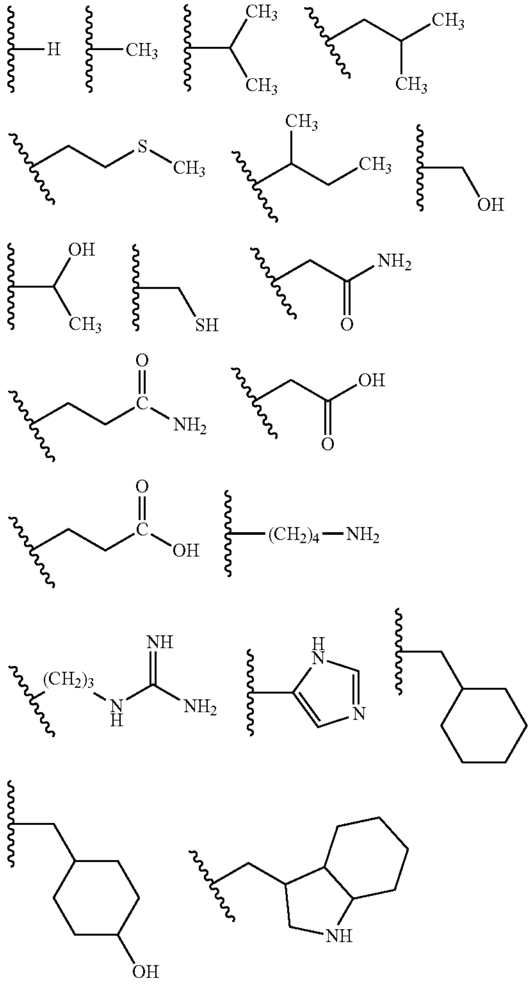

or $R_1$ and $R_3$, together with the atoms to which they are attached, form a five-membered heterocycle defined by the structure below when n is 1, or a six-membered heterocycle defined by the structure below when n is 2

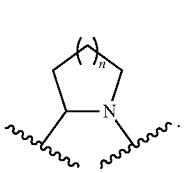

Poly(amino-acids), for example, polyarginine, polylysine, polyonithine, or polyhistidine may also be used to prepare the amino acid salt.

In other embodiments, the amine-containing mobile carrier can be defined by a formula below

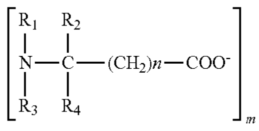

or

-continued

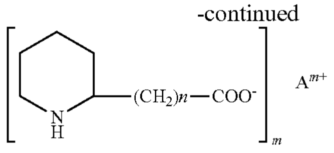

wherein $R_1$, $R_2$, $R_3$, and $R_4$ are hydrogen or hydrocarbon groups having from 1 to 4 carbon atoms, n is an integer ranging from 0 to 4, $A^{m+}$ is a cation having a valence of 1 to 3, In some cases, the cation ($A^{m+}$) can be an amine cation having the formula:

$$H-N^{+}(R_5)(R_6)-(CH_2)_y-R_7$$

wherein $R_5$ and $R_6$ are hydrogen or hydrocarbon groups having from 1 to 4 carbon atoms, $R_7$ is hydrogen or hydrocarbon groups having from 1 to 4 carbon atoms or an alkyl amine of from 2 to 6 carbon atoms and 1 to 4 nitrogen atoms, y is an integer ranging from 1 to 4, and m is an integer equal to the valence of the cation. In some embodiments; $A^{m+}$ is a metal cation selected from Groups Ia, IIa, and IIIa of the Periodic Table of Elements or a transition metal. For example, $A^{m+}$ can comprise lithium, aluminum, or iron.

Other suitable amine-containing mobile carriers include aminoisobutyric acid-potassium salt, aminoisobutyric acid-lithium salt, aminoisobutyric acid-piperazine salt, glycine-potassium salt, glycine-lithium salt, glycine-piperazine salt, dimethylglycine-potassium salt, dimethylglycine-lithium salt, dimethylglycine-piperazine salt, piperadine-2-carboxlic acid-potassium salt, piperadine-2-carboxlic acid-lithium salt, piperadine-2-carboxlic acid-piperazine salt, piperadine-4-carboxlic acid-potassium salt, piperadine-4-carboxlic acid-lithium salt, piperadine-4-carboxlic acid-piperazine salt, piperadine-3-carboxlic acid-potassium salt, piperadine-3-carboxlic acid-lithium salt, piperadine-3-carboxlic acid-piperazine salt, and blends thereof.

$CO_2$-Philic Ethers

The selective polymeric layer can further include a one or more $CO_2$-philic ethers dispersed within the polymer matrix. The $CO_2$-philic ether can be a polymer, oligomer, or small molecule containing one or more ether linkages. Examples of $CO_2$-philic ethers include alcohol ethers, polyalkylene alcohol ethers, polyalkylene glycols, poly(oxyalkylene)glycols, poly(oxyalkylene)glycol ethers, ethoxylated phenol. In one embodiment, the $CO_2$-philic ether can comprise alkyl ethoxylate (C1-C6)-(EO)x, where x=1-30 and the ethoxylate is linear or branched. In some embodiments, the $CO_2$-philic ether can comprise ethylene glycol butyl ether (EGBE), diethylene glycol monobutyl ether (DGBE), triethylene glycol monobutyl ether (TEGBE), ethylene glycol dibutyl ether (EGDE), polyethylene glycol monomethyl ether (mPEG), or any combination thereof.

Graphene Oxide

The selective polymer layer can further include graphene oxide.

The term "graphene" refers to a one-atom-thick planar sheet of $sp^2$-bonded carbon atoms that are densely packed in a honeycomb crystal lattice. In one embodiment, it refers to a single-layer version of graphite.

The term "graphene oxide" herein refers to functionalized graphene sheets (FGS)— the oxidized compositions of graphite. These compositions are not defined by a single stoichiometry. Rather, upon oxidation of graphite, oxygen-containing functional groups (e.g., epoxide, carboxyl, and hydroxyl groups) are introduced onto the graphite. Complete oxidation is not needed. Functionalized graphene generally refers to graphene oxide, where the atomic carbon to oxygen ratio starts at approximately 2. This ratio can be increased by reaction with components in a medium, which can comprise a polymer, a polymer monomer resin, or a solvent, and/or by the application of radiant energy. As the carbon to oxygen ratio becomes very large (e.g. approaching 20 or above), the graphene oxide chemical composition approaches that of pure graphene.

The term "graphite oxide" includes "graphene oxide", which is a morphological subset of graphite oxide in the form of planar sheets. "Graphene oxide" refers to a graphene oxide material comprising either single-layer sheets or multiple-layer sheets of graphite oxide. Additionally, in one embodiment, a graphene oxide refers to a graphene oxide material that contains at least one single layer sheet in a portion thereof and at least one multiple layer sheet in another portion thereof. Graphene oxide refers to a range of possible compositions and stoichiometries. The carbon to oxygen ratio in graphene oxide plays a role in determining the properties of the graphene oxide, as well as any composite polymers containing the graphene oxide.

The abbreviation "GO" is used herein to refer to graphene oxide, and the notation GO(m) refers to graphene oxide having a C:O ratio of approximately "m", where m ranges from 3 to about 20, inclusive. For example, graphene oxide having a C:O ratio of between 3 and 20 is referred to as "GO(3) to GO(20)", where m ranges from 3 to 20, e.g. m=3, 4, 5, 6, 7, 8, 9, 10, 11, 12, 13, 14, 15, 16, 17, 18, 19 or 20, including all decimal fractions of 0.1 increments in between, e.g. a range of values of 3-20 includes 3.0, 3.1, 3.2, 3.3, 3.4, 3.5, 3.6, 3.7, 3.8, 3.9, 4.0, and so on up to 20. Thus, as used herein, the term GO(m) describes all graphene oxide compositions having a C:O ratio of from 3 to about 20. For example, a GO with a C:O ratio of 6 is referred to as GO(6), and a GO with a C:O ratio of 8, is referred to as GO(8), and both fall within the definition of GO(m).

As used herein, "GO(L)" refers to low C:O ratio graphene oxides having a C:O ratio of approximately "L", wherein L is less than 3, e.g., in the range of from about 1, including 1, up to 3, and not including 3, e.g. about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, or about 2.9. In many embodiments, a GO(L) material has a C:O ratio of approximately 2. The designations for the materials in the GO(L) group is the same as that of the GO(m) materials described above, e.g. "GO(2)" refers to graphene oxide with a C:O ratio of 2.

In some embodiments, the graphene oxide can be GO(m). In some embodiments, the graphene oxide can be GO(L). In some embodiments, the graphene oxide can be nanoporous.

Other Components

In some embodiments, the polymer matrix can further include a cross-linking agent. Cross-linking agents suitable for use in the polymer matrix can include, but are not limited to, formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof. In some embodiments, the cross-linking agent can comprise formaldehyde, glutaraldehyde, or maleic anhydride. The polymer matrix can comprise any suitable amount of the cross-linking agent. For example, the polymer matrix can comprise 1 to 40 percent cross-linking agents by weight of the polymer matrix.

The polymer matrix can further include a base. The base can act as a catalyst to catalyze the cross-linking of the polymer matrix (e.g., cross-linking of a hydrophilic polymer with an amine-containing polymer). In some embodiments, the base can remain in the polymer matrix and constitute a part of the polymer matrix. Examples of suitable bases include potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof. In some embodiments, the base can include potassium hydroxide. The polymer matrix can comprise any suitable amount of the base. For example, the polymer matrix can comprise 1 to 40 percent base by weight of the polymer matrix.

The selective polymer layer further comprises carbon nanotubes dispersed within the polymer matrix. Any suitable carbon nanotubes (prepared by any suitable method or obtained from a commercial source) can be used. The carbon nanotubes can comprise single-walled carbon nanotubes, multiwalled carbon nanotubes, or a combination thereof.

In some cases, the carbon nanotubes can have an average diameter of a least 10 nm (e.g., at least 20 nm, at least 30 nm, or at least 40 nm). In some cases, the carbon nanotubes can have an average diameter of 50 nm or less (e.g., 40 nm or less, 30 nm or less, or 20 nm or less). In certain embodiments, the carbon nanotubes can have an average diameter ranging from any of the minimum values described above to any of the maximum values described above. For example, the carbon nanotubes can have an average diameter of from 10 nm to 50 nm (e.g., from 10 nm to 30 nm, or from 20 nm to 50 nm).

In some cases, the carbon nanotubes can have an average length of at least 50 nm (e.g., at least 100 nm, at least 200 nm, at least 300 nm, at least 400 nm, at least 500 nm, at least 600 nm, at least 700 nm, at least 800 nm, at least 900 nm, at least 1 μm, at least 5 μm, at least 10 μm, or at least 15 μm). In some cases, the carbon nanotubes can have an average length of 20 μm or less (e.g., 15 μm or less, 10 μm or less, 5 μm or less, 1 μm or less, 900 nm or less, 800 nm or less, 700 nm or less, 600 nm or less, 500 nm or less, 400 nm or less, 300 nm or less, 200 nm or less, or 100 nm or less).

In certain embodiments, the carbon nanotubes can have an average length ranging from any of the minimum values described above to any of the maximum values described above. For example, the carbon nanotubes can have an average length of from 50 nm to 20 μm (e.g., from 200 nm to 20 μm, or from 500 nm to 10 μm).

In some cases, the carbon nanotubes can comprise unfunctionalized carbon nanotubes. In other embodiments, the carbon nanotubes can comprise sidewall functionalized carbon nanotubes. Sidewall functionalized carbon nanotubes are well known in the art. Suitable sidewall functionalized carbon nanotubes can be prepared from unfunctionalized carbon nanotubes, for example, by creating defects on the sidewall by strong acid oxidation. The defects created by the oxidant can subsequently converted to more stable hydroxyl and carboxylic acid groups. The hydroxyl and carboxylic acid groups on the acid treated carbon nanotubes can then couple to reagents containing other functional groups (e.g., amine-containing reagents), thereby introducing pendant functional groups (e.g., amino groups) on the sidewalls of the carbon nanotubes. In some embodiments, the carbon nanotubes can comprise hydroxy-functionalized carbon nanotubes, carboxy-functionalized carbon nanotubes, amine-functionalized carbon nanotubes, or a combination thereof.

In some embodiments, the selective polymer layer can comprise at least 0.5% (e.g., at least 1%, at least 1.5%, at least 2%, at least 2.5%, at least 3%, at least 3.5%, at least 4%, or at least 4.5%) by weight carbon nanotubes, based on the total dry weight of the selective polymer layer. In some embodiments, the selective polymer layer can comprise 5% or less (e.g., 4.5% or less, 4% or less, 3.5% or less, 3% or less, 2.5% or less, 2% or less, 1.5% or less, or 1% or less) by weight carbon nanotubes, based on the total dry weight of the selective polymer layer.

The selective polymer layer can comprise an amount of carbon nanotubes ranging from any of the minimum values described above to any of the maximum values described above. For example, the selective polymer layer can comprise from 0.5% to 5% (e.g., from 1% to 3%) by weight carbon nanotubes, based on the total dry weight of the selective polymer layer.

If desired, the selective polymer layer can be surface modified by, for example, chemical grafting, blending, or coating to improve the performance of the selective polymer layer. For example, hydrophobic components may be added to the selective polymer layer to alter the properties of the selective polymer layer in a manner that facilitates greater fluid selectivity.

The total thickness of each layer in the membrane can be chosen such that the structure is mechanically robust, but not so thick as to impair permeability. In some embodiments, the selective polymer layer can have a thickness of from 50 nanometers to 5 microns (e.g., from 50 nm to 2 microns, or from 100 nanometers to 750 nanometers, or from 250 nanometers to 500 nanometers). In some embodiments, the support layer can have a thickness of from 1 micron to 500 microns (e.g., from 50 to 250 microns). In some cases, the membranes disclosed herein can have a thickness of from 5 microns to 500 microns.

Methods of Making

Methods of making these membranes are also disclosed herein. Methods of making membranes can include depositing (e.g., coating) a selective polymer layer on a support layer to form a selective layer disposed (e.g., coated) on the support layer. The selective polymer layer can comprise a polymer matrix and guanidine-based mobile carrier dispersed within the polymer matrix.

Optionally, the support layer can be pretreated prior to deposition (e.g., coating) of the selective polymer layer, for example, to remove water or other adsorbed species using methods appropriate to the support and the adsorbate. Examples of absorbed species are, for example, water, alcohols, porogens, and surfactant templates.

The selective polymer layer can be prepared by first forming a coating solution including the components of the polymer matrix (e.g., a hydrophilic polymer, an amine-containing polymer, or a combination thereof), a guanidine-based mobile carrier, and optionally one or more additional components (e.g., an amine-based mobile carrier, a $CO_2$-philic ether, graphene oxide, carbon nanotubes, a cross-linking agent, a basic compound, or a combination thereof) in a suitable solvent. One example of a suitable solvent is water. In some embodiments, the amount of water employed will be in the range of from 50% to 99%, by weight of the coating solution. The coating solution can then be used in forming the selective polymer layer. For example, the coating solution can be coated onto a support later (e.g., a nanoporous gas permeable membrane) using any suitable technique, and the solvent may be evaporated such that a nonporous membrane is formed on the substrate. Examples of suitable coating techniques include, but are not limited to, "knife coating" or "dip coating". Knife coating includes a process in which a knife is used to draw a polymer solution across a flat substrate to form a thin film of a polymer solution of uniform thickness after which the solvent of the polymer solution is evaporated, at ambient temperatures or temperatures up to about 100° C. or higher, to yield a fabricated membrane. Dip coating includes a process in which a polymer solution is contacted with a porous support. Excess solution is permitted to drain from the support, and the solvent of the polymer solution is evaporated at ambient or elevated temperatures. The membranes disclosed can be shaped in the form of hollow fibers, tubes, films, sheets, etc. In certain embodiments, the membrane can be configured in a flat sheet, a spiral-wound, a hollow fiber, or a plate-and-frame configuration.

In some embodiments, membranes formed from a polymer matrix containing for example, a hydrophilic polymer, an amine-containing polymer, a guanidine-containing mobile carrier, an amine-containing mobile carrier, a cross-linking agent, a base, and graphene oxide can be heated at a temperature and for a time sufficient for cross-linking to occur. In one example, cross-linking temperatures in the range from 80° C. to 100° C. can be employed. In another example, cross-linking can occur from 1 to 72 hours. The resulting solution can be coated onto the support layer and the solvent evaporated, as discussed above. In some embodiments, a higher degree of cross-linking for the polymer matrix after solvent removal takes place at about 100° C. to about 180° C., and the cross-linking occurs in from about 1 to about 72 hours.

An additive may be included in the selective polymer layer before forming the selective polymer layer to increase the water retention ability of the membrane. Suitable additives include, but are not limited to, polystyrenesulfonic acid-potassium salt, polystyrenesulfonic acid-sodium salt, polystyrenesulfonic acid-lithium salt, sulfonated polyphenyleneoxides, alum, and combinations thereof. In one example, the additive comprises polystyrenesulfonic acid-potassium salt.

In some embodiments, the method of making these membranes can be scaled to industrial levels.

Methods of Use

The membranes disclosed herein can be used for separating gaseous mixtures. For example, provided are methods for separating a first gas from a feed gas comprising the first gas and one or more additional gases (e.g., at least a second gas). The method can include contacting any of the disclosed membranes (e.g., on the side comprising the selective polymer) with the feed gas under conditions effective to afford transmembrane permeation of the first gas. In some embodiments, the method can also include withdrawing from the reverse side of the membrane a permeate containing at least the first gas, wherein the first gas is selectively removed from the gaseous stream. The permeate can comprise at least the first gas in an increased concentration relative to the feed stream. The term "permeate" refers to a portion of the feed stream which is withdrawn at the reverse or second side of the membrane, exclusive of other fluids such as a sweep gas or liquid which may be present at the second side of the membrane.

The membrane can be used to separate gases at any suitable temperature, including temperatures of 77° C. or greater. For example, the membrane can be used at temperatures of from 57° C. to 97° C. In some embodiments, a vacuum can be applied to the permeate face of the membrane to remove the first gas. In some embodiments, a sweep gas can be flowed across the permeate face of the membrane to remove the first gas. Any suitable sweep gas can be used. Examples of suitable sweep gases include, for example, air, steam, nitrogen, argon, helium, and combinations thereof.

The first gas can include an acid gas. For example, the first gas can be carbon dioxide, hydrogen sulfide, sulfur dioxide, sulfur trioxide, nitrogen oxide, or combinations thereof. In some embodiments, the membrane can be selective to carbon dioxide versus hydrogen, nitrogen, carbon monoxide, or combinations thereof. In some embodiments, the membrane can be selective to hydrogen sulfide versus hydrogen, nitrogen, carbon monoxide, or combinations thereof.

In certain embodiments, the first gas can comprise carbon dioxide and the second gas can comprise hydrogen. In certain embodiments, the first gas can comprise carbon dioxide and the second gas can comprise nitrogen.

The permeance of the first gas or the acid gas can be at least 50 GPU (e.g., 75 GPU or greater, 100 GPU or greater, 150 GPU or greater, 200 GPU or greater, 250 GPU or greater, 300 GPU or greater, 350 GPU or greater, 400 GPU or greater, 450 GPU or greater, 500 GPU or greater, 550 GPU or greater, 600 GPU or greater, 650 GPU or greater, 700 GPU or greater, 750 GPU or greater, 800 GPU or greater, 850 GPU or greater, 900 GPU or greater, 950 GPU or greater, 1000 GPU or greater, 1100 GPU or greater, 1200 GPU or greater, 1300 GPU or greater, or 1400 GPU or greater) at 77° C. and 4 bar feed pressure.

The permeance of the first gas or the acid gas can be 1500 GPU or less at 77° C. and 4 bar feed pressure (e.g., 1400 GPU or less, 1300 GPU or less, 1200 GPU or less, 1100 GPU or less, 1000 GPU or less, 950 GPU or less, 900 GPU or less, 850 GPU or less, 800 GPU or less, 750 GPU or less, 700 GPU or less, 650 GPU or less, 600 GPU or less, 550 GPU or less, 500 GPU or less, 450 GPU or less, 400 GPU or less, 350 GPU or less, 300 GPU or less, 250 GPU or less, 200 GPU or less, 150 GPU or less, 100 GPU or less, or 75 GPU or less).

The permeance of the first gas or the acid gas through the membrane can vary from any of the minimum values described above to any of the maximum values described above or even higher. For example, the permeance of the first gas or the acid gas can be from 50 GPU to 1500 GPU or even to 3000 GPU at 77° C. and 4 bar feed pressure (e.g., from 300 GPU to 1500 GPU at 77° C., or from 500 GPU to 1500 GPU or even to 3000 GPU at 77° C. and 4 bar feed pressure).

The membrane can exhibit a first gas/second gas selectivity of at least 10 at 77° C. and 4 bar feed pressure. In some embodiments, the membrane can exhibit a first gas/second gas selectivity of up to 500 at 77° C. and 4 bar feed pressure. For example, the membrane can exhibit a first gas/second gas selectivity of 10 or greater, 25 or greater, 50 or greater, 75 or greater, 100 or greater, 125 or greater, 150 or greater, 175 or greater, 200 or greater, 225 or greater, 250 or greater, 275 or greater, 300 or greater, 325 or greater, 350 or greater, 375 or greater, 400 or greater, 425 or greater, 450 or greater, or 475 or greater at 67° C. and 4 bar feed pressure. In some embodiments, the permeance and selectivity of the membrane for the first gas or the acid gas can vary at higher or lower temperatures.

By way of non-limiting illustration, examples of certain embodiments of the present disclosure are given below.

EXAMPLES

Overview

Described herein are guanidine-containing membranes for $CO_2/N_2$ separation with a vacuum pulled on the permeate side. The polymeric selective layer, coated on top of a highly permeable nanoporous support, comprises of a mixture of polyvinylamine and polyvinylalcohol as the polymer matrix and $CO_2$-reactive small molecules as mobile carriers to facilitate the transport of $CO_2$. To prepare the mobile carriers, sarcosine is deprotonated by 2-(1-piperazinyl)ethylamine to form an aminoacid salt, followed by blending with a super organic base, 1,1,3,3-tetramethylguanidine. Perforated graphene oxide mono-sheets were dispersed in the selective layer to reinforce the flexural rigidity of the selective layer upon feed compression and vacuum suction. The membrane demonstrates excellent $CO_2/N_2$ separation performance at 77° C. with 500-h good stability.

Background

In 2016, the combustion of coal still accounts for 50% electricity supply and about a third of $CO_2$ emissions in U.S. [1]. Carbon capture and storage could play an important role in cutting the carbon footprint in the energy sector. However, retrofitting a current coal-fired power plant by an amine solution-based capture system would increase the cost of electricity by 70-80% and incur a 25-40% energy penalty [2]. Membranes, as a promising next-generation technology, have demonstrated performance in many industrial applications such as air separation and natural gas sweetening [3].

An approach for polymeric membrane synthesis is to coat an ultrathin selective layer of polymer onto a nanoporous support, such as an ultrafiltration membrane made from polysulfone, polyethersulfone, or polyetherimide. Efforts have focused on designing polymers with high $CO_2$ permeance and decent $CO_2/N_2$ selectivity. On one hand, polar functional groups, such as ethylene oxide groups, have been incorporated to increase the physical $CO_2$ solubility in the polymer matrix; the dissolved $CO_2$ molecules diffuse through the membrane [4-6]. On the other hand, reactive functional groups and compounds have been used as carriers to reversibly react with $CO_2$ [7]. The chemical reaction enhances the permeation of $CO_2$ through the membrane, and this type of membrane is named as facilitated transport membrane.

In this second approach, amines are the most exploited carriers. The reaction mechanisms between $CO_2$ and amines are depicted in Scheme I below. The reactivity of $CO_2$ derives from the high electron deficiency of the carbon bonded to the two highly electronegative oxygen atoms. For primary and secondary amines with a lone electron pair on the nitrogen atom, the amine functions as a nucleophile (i.e., a Lewis base) which attacks the electrophile carbonyl group on $CO_2$ to form a zwitterion. The zwitterion rapidly equilibrates to the corresponding carbamic acid and then is deprotonated by another amine to form a more stable carbamate ion, which leads to 2 moles of amine for 1 mole of $CO_2$ [8]. Many successes have been reported by exploring various amine structures, yielding $CO_2$-selective membranes with considerable $CO_2$ permeance [9-12].

$$CO_2+RNH_2 \rightleftharpoons RHN_2^+COO^- \rightleftharpoons RHNCOOH$$

$$RHNCOOH+RNH_2 \rightleftharpoons RHNCOO^-+RNH_3^+$$

Scheme I. Reaction between amine and $CO_2$: zwitterion mechanism.

Although the amine structure can be further fine-tuned to enhance the $CO_2$ loading capacity [13], other $CO_2$-reactive carriers offer potential. One promising candidate is a class of organic bases, guanidines. A generalized guanidine moiety, $(R_1R_2N)(R_3R_4N)C{=}N{-}R_5$, is shown in FIG. 1. Also shown are several guanidine-based mobile carriers of interest, namely, 1,1,3,3-tetramethylguanidine (TMG), N-(alkylamine)TMG, and N-(alkanol)TMG. The guanidine moiety has a high electron density due to the efficient resonance stabilization of the charges on its three amino groups connected to the carbon center [14]. This feature can be exploited to provide for efficient $CO_2$ fixation. Guanidine might react with $CO_2$ in multiple mechanisms as shown in Scheme II. Firstly, guanidine can attack the electron deficient carbon center of $CO_2$ as a nucleophile to form a zwitterion (Scheme II (a)) [15]. The zwitterion can be further hydrolyzed to bicarbonate in the presence of water. Secondly, guanidine can titrate the carbamic acid formed by the $CO_2$-amine reaction to produce a carbamate ion and a guanidinium ion (Scheme II (b)) [16]. Thirdly, in the presence of primary or secondary alcohol, guanidine activates the insertion of $CO_2$ onto the hydroxyl group to form an alkylcarbonate salt (Scheme II (c)) [17]. All these reaction mechanisms lead to 1 mole of $CO_2$ for 1 mole of guanidine.

Scheme II. Reactions between guanidine and $CO_2$: (a) zwitterion mechanism; (b) Brønsted acid-base reaction mechanism; (c) alkylcarbonate mechanism.

Scheme II (a)

Scheme II (b)

Scheme II (c)

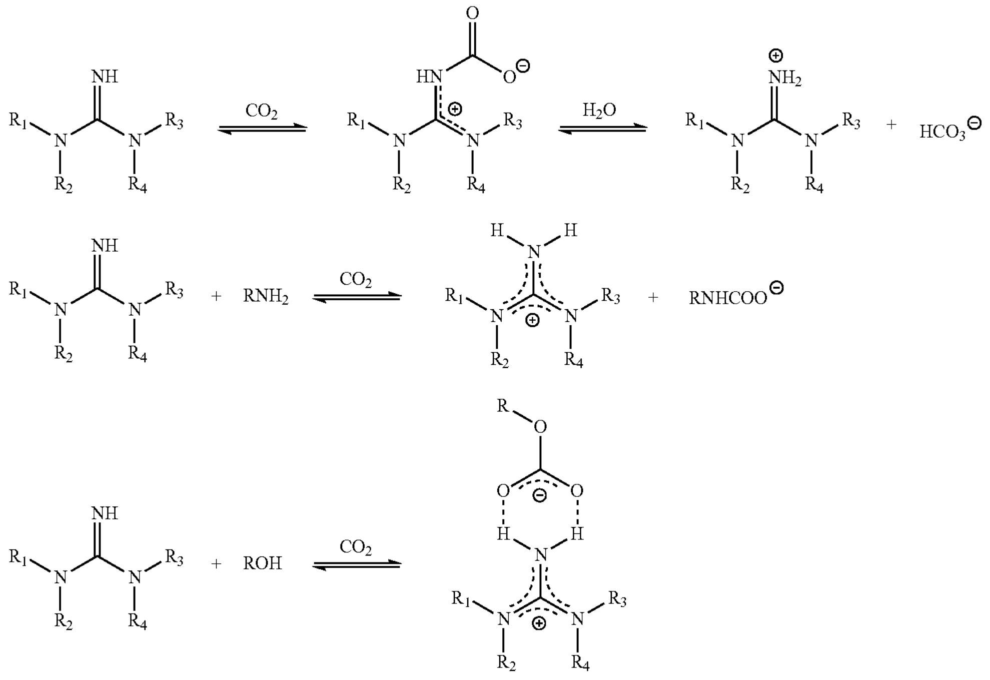

Herein, membranes comprising a guanidine-based mobile carrier are described. The membranes can include a selective polymer layer that includes a guanidine-based mobile carrier dispersed in a polymeric matrix. The polymeric matrix can comprise a hydrophilic polymer, an amine-containing polymer, or a combination thereof. In some cases, the selective polymer layer can further include an amino compound (an amine-containing mobile carrier) dispersed within the polymeric matrix. In some embodiments, the selective polymer layer can further include a graphene oxide dispersed within the polymer matrix. The membranes can be used for $CO_2/N_2$ separation (e.g., with a vacuum pulled on the permeate side). The selective polymer layer can be coated on top of a highly permeable nanoporous support.

In one embodiment, the selective polymer layer can comprise a mixture of polyvinylamine and polyvinylalcohol as the polymer matrix, and $CO_2$-reactive small molecules as mobile carriers to facilitate the transport of $CO_2$. To prepare the mobile carriers, sarcosine was deprotonated by 2-(1-piperazinyl)ethylamine to form an aminoacid salt, followed by blending with the super organic base, TMG. Perforated graphene oxide mono-sheets were dispersed in the selective polymer layer to reinforce the flexural rigidity of the selective polymer layer upon feed compression and vacuum suction. The membrane demonstrated excellent $CO_2/N_2$ separation performance at 77° C. with 500-h good stability.

Materials and Methods 2-(1-piperazinyl)ethylamine (PZEA, 99%), sarcosine (Sar, 98%), 1,1,3,3-tetramethylguanidine (TMG, 50 wt. %), and piperazine-1-carboximidamide (PZC, 99%) were purchased from Sigma-Aldrich (Milwaukee, WI). Polyvinylalcohol (PVA, Poval S-2217, 92%) was given by Kuraray America Inc. (Houston, TX). Monolayer graphene oxide (GO) was purchased from TCI America (Portland, OR, USA) in the form of solid flakes. All the chemicals were used as received without further purification. For gas permeation measurements, pre-purified $CO_2$ and argon were purchased from Praxair Inc. (Danbury, CT).

A variety of amine-containing polymers can be used, including polyvinylamine (PVAm), polyallylamine, polyethyleneimine, copolymers, and blends thereof. The amine-containing polymer PVAm used in the examples was purified from a commercial product named Polymin® VX from BASF (Vandalia, IL). The PVAm had a high weight average molecular weight of 2,000 kDa. The amine-containing polymer can have a weight average molecular weight of from 300 to 3,000 kDa. In some cases, the molecular weight of the amine-containing polymer can be higher than 1000 kDa.

Preparation of Nanoporous Graphene Oxide (GO). The GO was dispersed in water (~1 mg/ml) by an ultrasonication probe with a power of 2500 W for 3 hr. KOH solution (50 wt. %) was added slowly into the GO dispersion with a KOH-to-GO weight ratio of 14:1 to prevent the precipitation of GO. The mixture was further ultrasonicated for 30 min. After this, the water was evaporated in a convection oven at 60° C., followed by a further drying in a vacuum oven at 60° C. overnight. The resultant solid was annealed at 200° C. for 2 h to create pores on the GO basal plane. After the thermal treatment, the solid was washed by DI water under vacuum filtration until the filtrate reached a pH of 7. The purified nanoporous GO (nGO) was dispersed in water again (~1 mg/ml) using a ultrasonication bath.

Coating Solution and Membrane Preparation. nGO-reinforced composite membranes were synthesized by the following steps.

Firstly, the purified PVAm solution was concentrated to 4 wt. % by evaporating water under nitrogen purge at 50° C. The nGO dispersion with a concentration of ~1 mg/ml was added dropwise to the polymer solution by a 10-μL glass capillary tube under vigorous agitation, aiming for 1.5 wt. % nGO loading in the final total solid of the coating solution. The mixture was transferred to a 15-mL conical centrifuge tube, in which it was homogenized by the ⅛" Microtip sonication probe with a 50% amplitude until uniformly dispersed. The sonication was carried out in an ice bath. The water introduced by the nGO dispersion was vaporized by a nitrogen purge.

Figure 2:
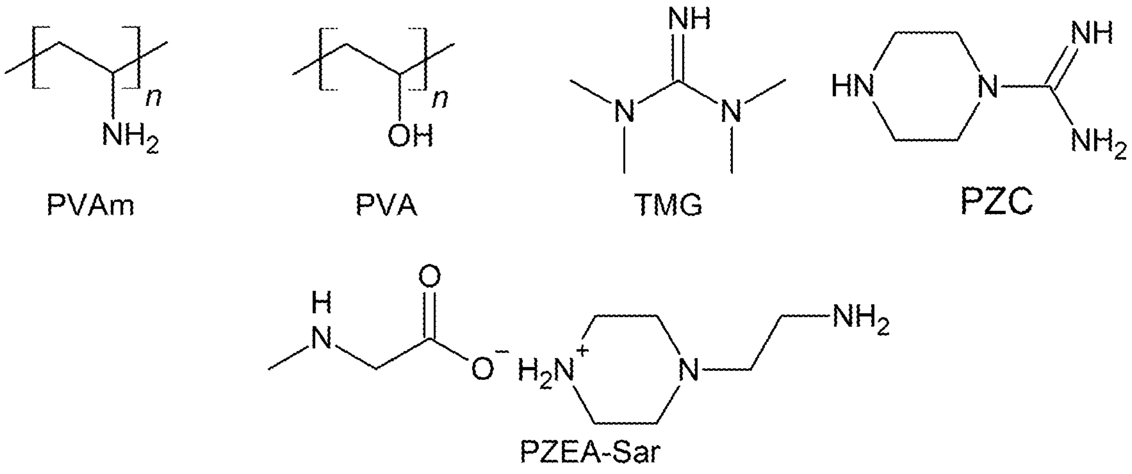
FIG. 2 shows the chemical structures of the chemical components used to form example membranes described herein.

The aminoacid salt mobile carriers were synthesized by reacting the base, PZEA, with an aminoacid, Sar. The stoichiometric amount of Sar was added in a 24 wt. % PZEA aqueous solution under vigorous mixing. The solution was mixed at room temperature for 2 h before use. The chemical structures of PVAm, PVA, PZEA-Sar, TMG, and PZC are shown in FIG. 2.

The certain amounts of the mobile carrier solutions, including the aminoacid salt and/or TMG, were incorporated in the dispersion to form the coating solution. After centrifugation at 8,000×g for 3 min to remove any air bubbles and/or particulates, the coating solution was coated on a nanoporous polyethersulfone (PES) substrate by a GARDCO adjustable micrometer film applicator (Paul N. Gardner Company, Pompano Beach, FL) with a controlled gap setting. The PES substrate was synthesized in house with a surface average pore size of 32 nm [18]. Ideally, the coating solution should have a viscosity >1100 cp at a total solid content <15 wt. % in order to form a defect-free selective layer with a thickness ca. 170 nm. The membrane was dried in a fume hood at room temperature for at least 6 h before testing.

Gas Permeation Measurements. The transport properties of the composite membrane were measured by a gas permeation apparatus [4,9-13]. The synthesized membrane was loaded into a stainless-steel rectangular permeation cell inside a temperature-controlled oven (Bemco Inc. Simi Valley, CA) with an effective area of 2.7 $cm^2$. The membrane was supported by a sintered stainless-steel plate with an average pore size of 100 μm. A 100-sccm dry feed gas containing 20% $CO_2$ and 80% $N_2$ was used. The mixed gas was achieved by mixing the two gas streams of $CO_2$ and $N_2$ controlled by two mass flow controllers, respectively. The feed gas was fully saturated with water vapor by bubbling through 100 mL water in a 500-mL stainless-steel humidifier (Swagelok, Westerville, OH) packed with 60 vol. % Raschig rings. The humidifier temperature was controlled at 57° C., which is the typical flue gas temperature leaving the flue gas desulfurization (FGD) unit. The feed pressure was controlled at 1-5 atm (abs) by a near-ambient pressure regulator. The outlet gas was sent to an Agilent 6890N gas chromatograph (GC, Agilent Technologies, Palo Alto, CA) for composition analysis after the moisture was knocked out by a condenser at room temperature. The GC was equipped with thermal conductivity detectors and a SUPELCO Carboxen® 1004 micropacked GC column (Sigma-Aldrich, St. Louis, MO).

The permeate side of the permeation cell was connected to an Ebara MD1 vacuum diaphragm pump (Ebara Technologies, Inc., Sacramento, CA). The permeate pressure was controlled precisely at 0.1-0.9 atm by a vacuum regulator (VC, Alicat Scientific, Inc., Tucson, AZ). Before the permeate stream entered the vacuum pump, it passed through a 1-L stainless-steel water knockout vessel that was cooled by a chiller (Fisher Scientific, Hampton, NH) at 0° C. to remove the moisture. A 30-sccm dry argon was directed to carry the vacuum pump discharge to the GC for composition analysis.

Example 1 (Comparative)

In this example, only PZEA-Sar but not TMG was used as the mobile carrier to facilitate the $CO_2$ transport in a polymer matrix formed by PVAm.

20.002 g of the dilute PVAm solution (1.5 wt. %) was concentrated to 4 wt. % by evaporating the water under a $N_2$ purge. Then, 20.303 g nGO dispersion (ca. 1 mg/ml) was added in the concentrated PVAm solution dropwise under vigorous mixing. After this, the mixture was sonicated to re-disperse. Then, the water introduced by the nGO dispersion was evaporated by $N_2$. Finally, 3.936 g PZEA-Sar aqueous solution (43.19 wt. %) was added in the dispersion to form a homogeneous coating solution. The viscosity of the coating solution, was approximately 1522 cp. The adjustable micrometer film applicator was used to coat the coating solution on the nanoporous PES substrate with an average surface pore size of 32.0 nm. The membrane was dried overnight before the gas permeation test. A selective polymer layer thickness of 170 nm was achieved by adjusting the gap setting of the film applicator. After overnight drying, the selective polymer layer contained 1.5 wt. % nGO in the total solid content, and the PVAm-to-PZEA-Sar ratio was 15/85 (wt./wt.). This membrane was tested at 67° C. with feed and permeate pressures of 4 and 0.3 atm, respectively.

The amine carrier reacts with $CO_2$ via the zwitterion mechanism as depicted in Scheme I. The amine-based mobile carrier resulted in a $CO_2$ permeance of 1456 GPU (1 GPU=$10^{-6}$ $cm^3$(STP)·$cm^{-2}$·$s^{-1}$·cmHg) and a $CO_2/N_2$ selectivity of 172. The selectivity is particular high for $CO_2/N_2$ separation, which is beneficial for reducing the energy consumption of the membrane-based process. A further improved $CO_2$ permeance, however, can confer a reduced footprint, thus potentially driving down the membrane system cost.

Example 2

In this example, PZEA-Sar was partially replaced by TMG as the mobile carrier to facilitate the $CO_2$ transport in a polymer matrix formed by PVAm. The chemical structure of TMG is shown in FIG. 1. TMG is a super organic base that is fully miscible with water.

20.015 g of the dilute PVAm solution (1.5 wt. %) was concentrated to 4 wt. % by evaporating the water under a $N_2$ purge. Then, 20.313 g nGO dispersion (ca. 1 mg/ml) was added in the concentrated PVAm solution dropwise under vigorous mixing. After this, the mixture was sonicated to re-disperse. Then, the water introduced by the nGO dispersion was evaporated by $N_2$. Finally, various amounts of PZEA-Sar aqueous solution (43.19 wt. %) and TMG were added in the dispersion to achieve a PVAm-to-mobile carrier ratio of 15/85 (wt./wt.). The homogeneous coating solution was coated on the PES substrate in the same fashion as the membrane in Example 1. The membranes were dried overnight before the gas permeation test at 67° C. with feed and permeate pressures of 4 and 0.3 atm, respectively.

Figure 3:
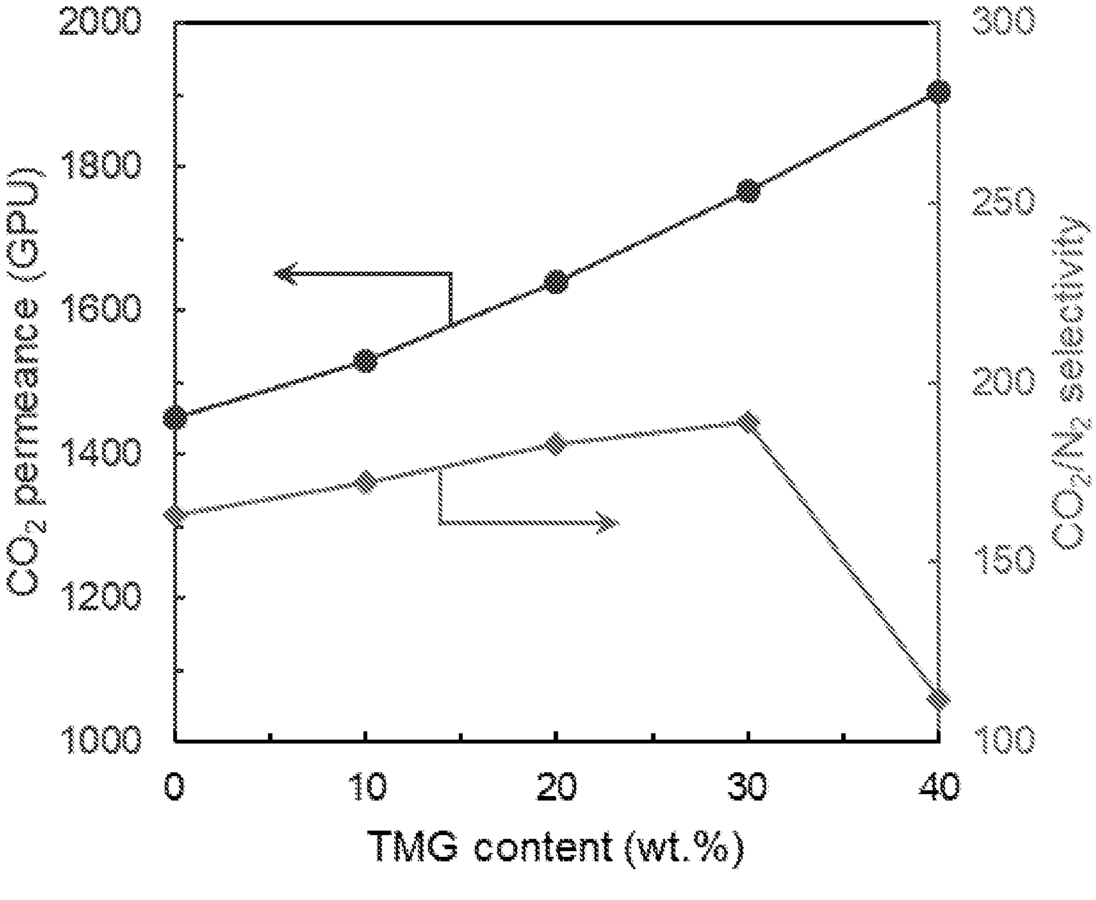
FIG. 3 is a plot showing separation performance of membranes with different quantities of TMG at 67° C.

FIG. 3 shows the separation performances of the membranes containing 0-40 wt. % TMG. As shown in FIG. 3, TMG was shown to be a more effective mobile carrier than PZEA-Sar. A high $CO_2$ permeance of 1766 GPU with a $CO_2/N_2$ selectivity of 196 was obtained with 30 wt. % TMG and 53.7 wt. % PZEA-Sar. The enhanced $CO_2$ permeance was attributed to the more favorable TMG-$CO_2$ reaction, where TMG either reacted with $CO_2$ via the zwitterion mechanism (Scheme II (a)) or served as the Brønsted base to enhance the amine-$CO_2$ reaction (Scheme II (b)).

Further increasing the TMG content to 40 wt. % led to a sudden reduction in the selectivity, which suggested incompatibility of TMG and the polymer matrix at a molecular level when the TMG content was excessive. Compared to the membrane in Example 1 where only PZEA-Sar was used, the membrane containing 30 wt. % TMG showed a 21% increase in the $CO_2$ permeance and an even improved $CO_2/N_2$ selectivity.

Example 3

In this example, PVA was incorporated in the membrane composition exhibited in Example 2 as a secondary alcohol to enhance the TMG-$CO_2$ reaction. 20.003 g of the dilute PVAm solution (1.5 wt. %) was concentrated to 4 wt. % by evaporating the water under a $N_2$ purge. Then, calculated amount of nGO dispersion (ca. 1 mg/ml) was added in the concentrated PVAm solution dropwise under vigorous mixing, aiming for 1.5 wt. % nGO in the final selective layer. After this, the mixture was sonicated to re-disperse. Then, the water introduced by the nGO dispersion was evaporated by $N_2$. Certain amount of PVA solution (10 wt. %) was then added to the dispersion. Finally, various amounts of PZEA-Sar aqueous solution (43.19 wt. %) and TMG were added in the dispersion to form a homogeneous coating solution. This viscous solution was coated on the PES substrate in the same fashion as the membrane in Example 1. The membranes were dried overnight before the gas permeation test at 67° C. with feed and permeate pressures of 4 and 0.3 atm, respectively.

Table 1 lists the separation performances of the membranes with different ratios of polymers and mobile carriers. As seen, the incorporation of PVA significantly increased the $CO_2$ permeance for ca. 21% compared to the best composition in Example 2. For Membrane 3 in Table 1, a high $CO_2$ permeance of 2249 GPU with a considerably high $CO_2/N_2$ selectivity was achieved. This improved performance was attributed to the synergistic effect of PVA and TMG, where the fixation of $CO_2$ into the alkyl carbonate yielded very fast reaction kinetics (Scheme II (c)).

TABLE 1

Membrane compositions and separation performances at 4 atm feed pressure and 67° C.

| Membrane | PVAm (wt. %) | PVA (wt. %) | PZEA-Sar (wt. %) | TMG (wt. %) | nGO (wt.) | $CO_2$ Permeance (GPU) | $CO_2/N_2$ Selectivity |
|---|---|---|---|---|---|---|---|
| 1 | 9.85 | 9.85 | 39.4 | 39.4 | 1.5 | 2024 | 177 |
| 2 | 7.88 | 11.82 | 39.4 | 39.4 | 1.5 | 2144 | 177 |
| 3 | 7.88 | 13.82 | 38.4 | 38.4 | 1.5 | 2249 | 188 |

Example 4

Figure 4:
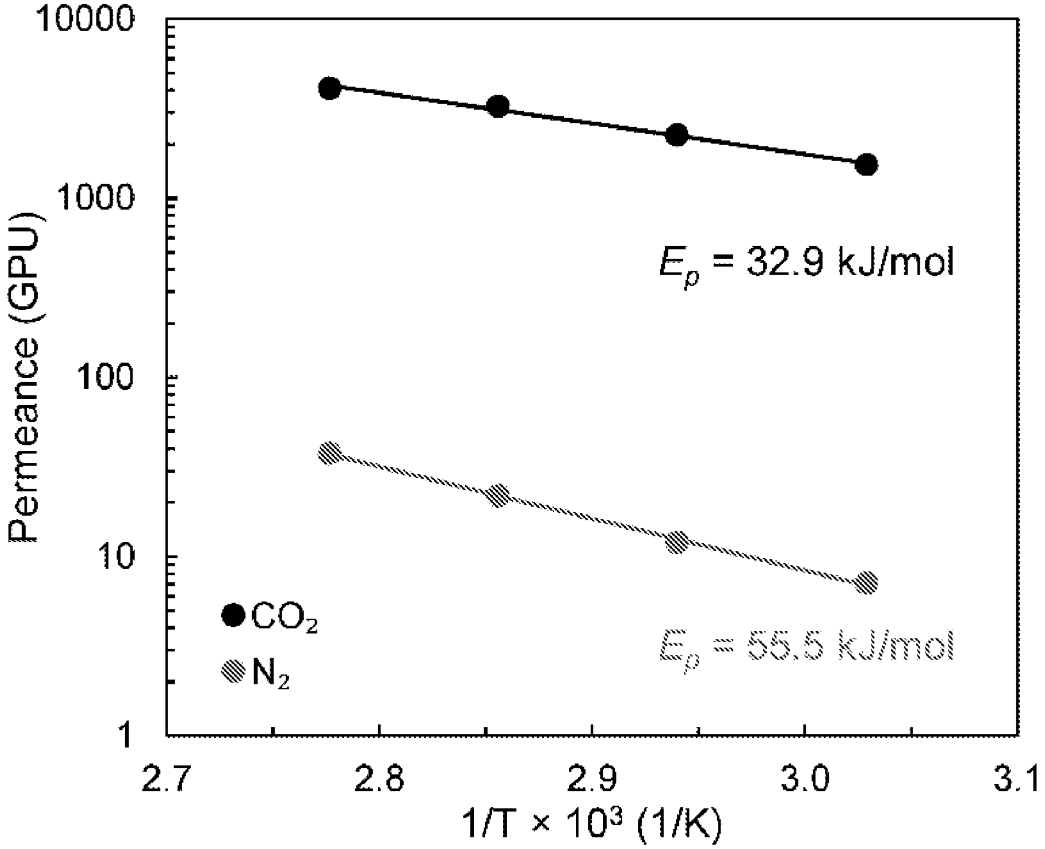
FIG. 4 is a plot showing the $CO_2$ and $N_2$ permeances of Membrane 3 as a function of reciprocal of absolute temperature at 4 atm feed pressure.

In this example, Membrane 3 listed in Example 3 was tested at temperatures ranging from 57° C. to 87° C. The results are shown in FIG. 4. As seen, the operating temperature had salient effects on the permeances of both gas species. The temperature dependences of gas permeances actually followed the Arrhenius relation $$P_i = P_i^0 \exp\left(-\frac{E_p}{RT}\right),$$

where $P_i^0$ is a pre-exponential factor, $E_p$ is the activation energy of permeation, R is the ideal gas constant, and T is the absolute temperature. The membrane demonstrated a high permeance of 3263 GPU with a decent selectivity of 149 at 77° C. Further increasing the temperature to 87° C. benefited the permeance but penalized the selectivity. The stability of Membrane 3 at 77° C. was tested in the presence of 3 ppm $SO_2$ and 7% $O_2$ to simulate a typical flue gas from coal-fired power plants.

Figure 5:
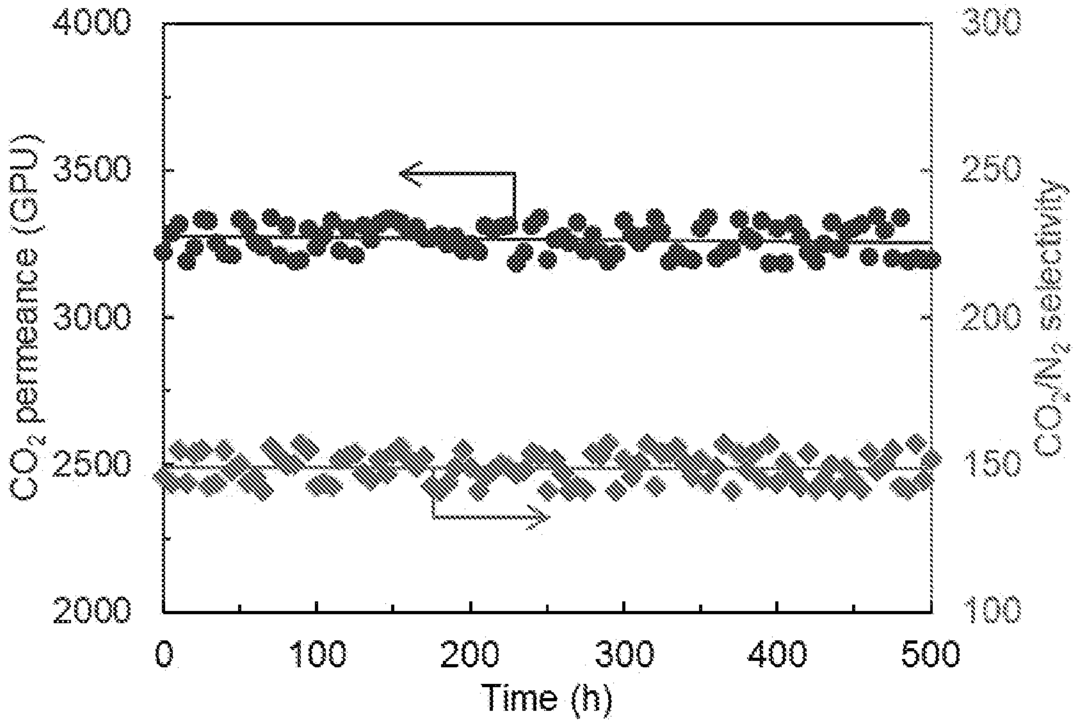
FIG. 5 is a plot showing the stability of Membrane 3 with simulated flue gas at 77° C. and 4 atm feed pressure.

As shown in FIG. 5, a 500-h stability was achieved at 77° C., indicating potential for this membrane for industrial implementation.

Example 5

In this example, TMG was replaced by PZC as the mobile carrier to facilitate the $CO_2$ transport in a polymer matrix formed by PVAm. The chemical structure of PZC is shown in FIG. 1.

20.015 g of the dilute PVAm solution (1.5 wt. %) was concentrated to 4 wt. % by evaporating the water under a $N_2$ purge. Then, 20.313 g nGO dispersion (ca. 1 mg/ml) was added in the concentrated PVAm solution dropwise under vigorous mixing. After this, the mixture was sonicated to re-disperse. Then, the water introduced by the nGO dispersion was evaporated by $N_2$. 5.265 g of PVA solution (10 wt. %) was then added to the dispersion. Finally, 3.387 g of PZEA-Sar aqueous solution (43.19 wt. %) and 1.463 g PZC were added in the dispersion to achieve a PVAm-to-mobile carrier ratio of 15/85 (wt./wt.). The homogeneous coating solution was coated on the PES substrate in the same fashion as the membrane in Example 1. The membranes were dried overnight before the gas permeation test at 57-87° C. with feed pressure of 4 atm.

Figure 6:
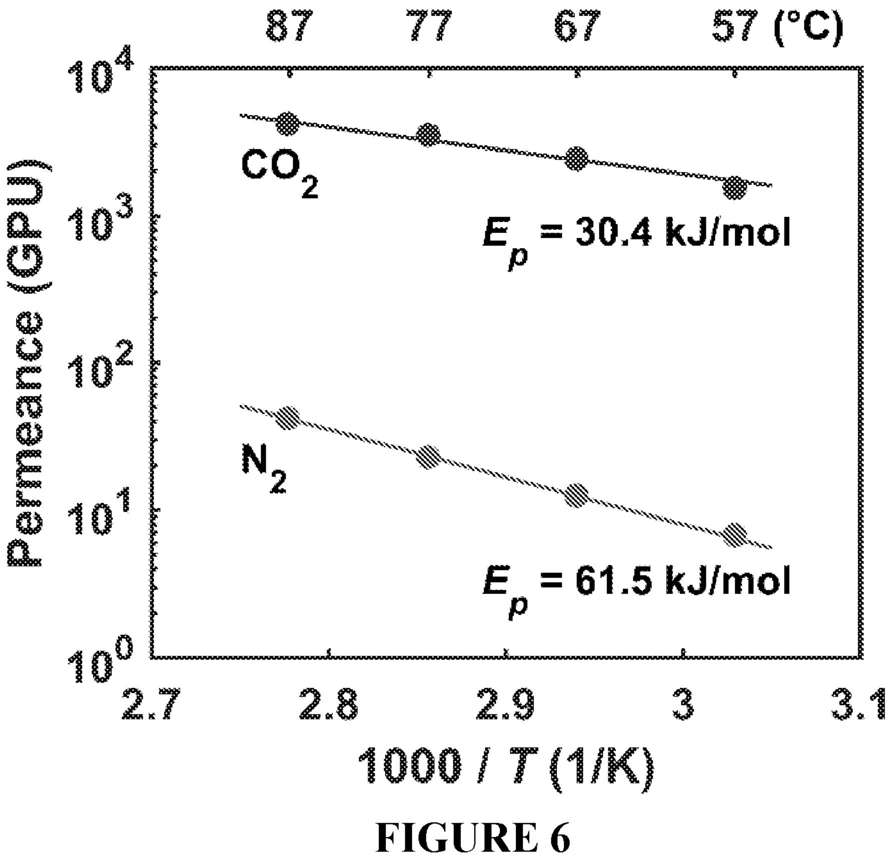
FIG. 6 is a plot showing the $CO_2$ and $N_2$ permeances of a membrane containing PZC as a function of reciprocal of absolute temperature at 4 atm feed pressure.

The results are depicted in an Arrhenius plots as shown in FIG. 6. The $E_p$ values of $CO_2$ and $N_2$ were 30.4 and 61.5 kJ/mol, respectively. A consequence of the higher activation energy for $N_2$ was that the $N_2$ permeance increased faster than the $CO_2$ permeance with increasing temperature. For this reason, the $CO_2/N_2$ selectivity reduced from 225 to 188 when the temperature increased from 57 to 67° C., then further reduced to 159 and 100 at 77 and 87° C., respectively. Overall, the best permeance and selectivity combination was achieved at a temperature of 77° C., with a $CO_2$ permeance of 3,501 GPU and a $CO_2/N_2$ selectivity of 159.

Figure 7:
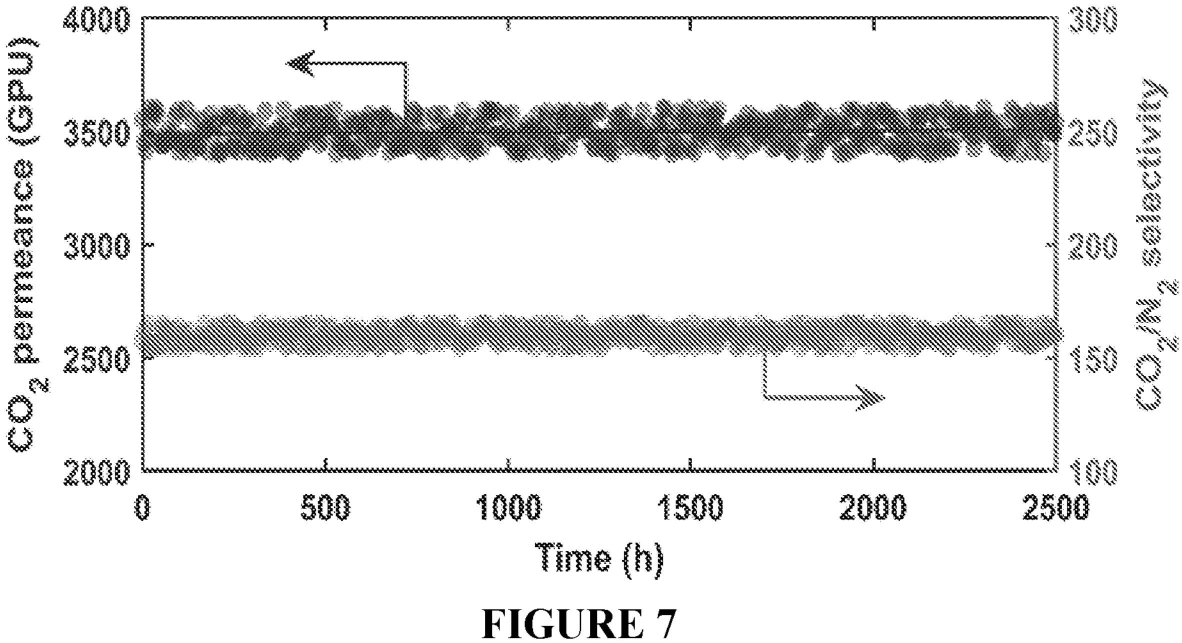
FIG. 7 is a plot showing the stability of the membrane containing PZC with simulated flue gas at 77° C. and 4 atm feed pressure.

The long-term stability of this membrane is shown in FIG. 7 with a simulated flue gas the same as the one in Example 4. As shown, a 2,500-h stability was achieved at 77° C., indicating potential for this membrane for industrial implementation.

REFERENCES

[1] V. Andreoni, S. Galmarini, Drivers in $CO_2$ emissions variation: A decomposition analysis for 33 world countries, Energy 103 (2016) 27-37.

[2] J. Black, Cost and Performance Baseline for Fossil Energy Plants Volume 1: Bituminous Coal and Natural Gas to Electricity Final report, 2nd ed., National Energy Technology Laboratory, November 2010.

[3] W. S. W. Ho, K. K. Sirkar, Membrane Handbook, Chapman & Hall, New York, 1992, Kluwer Academic Publishers, Boston, reprint edition, 2001.

[4] Y. Chen, B. Wang, L. Zhao, P. Dutta, W. S. W. Ho, New Pebax®/zeolite Y composite membranes for $CO_2$ capture from flue gas, J. Membr. Sci. 495 (2015) 415-423.

[5] W. Yave, A. Car, J. Wind, K.-V. Peinemann, Nanometric thin film membranes manufactured on square meter scale: Ultra-thin films for $CO_2$ capture, Nanotechnology 21 (2010) 395301.

[6] W. Yave, A. Car, S. S. Funari, S. P. Nunes, K.-V. Peinemann, $CO_2$-philic polymer membrane with extremely high separation performance, Macromolecules 43 (2009) 326-333.

[7] Y. Han, W. S. W. Ho, Recent advances in membranes for $CO_2$ capture, Chin. J. Chem. Eng. 26 (2018) 2238-2254.

[8] P. Danckwerts, The reaction of $CO_2$ with ethanolamines, Chem. Eng. Sci. 34 (1979) 443-446.

[9] Y. Han, D. Wu, W. S. W. Ho, Simultaneous effects of temperature and vacuum and feed pressures on facilitated transport membrane for $CO_2/N_2$ separation, J. Membr. Sci. 573 (2019) 476-484.

[10] Y. Han, D. Wu, W. S. W. Ho, Nanotube-reinforced facilitated transport membrane for $CO_2/N_2$ separation with vacuum operation, J. Membr. Sci. 567 (2018) 261-271.

[11] Y. Chen, W. S. W. Ho, High-molecular-weight polyvinylamine/piperazine glycinate membranes for $CO_2$ capture from flue gas, J. Membr. Sci. 514 (2016) 376-384.

[12] Y. Chen, L. Zhao, B. Wang, P. Dutta, W. S. W. Ho, Amine-containing polymer/zeolite Y composite membranes for $CO_2/N_2$ separation, J. Membr. Sci. 497 (2016) 21-28.

[13] Z. Tong, W. S. W. Ho, New sterically hindered polyvinylamine membranes for $CO_2$ separation and capture, J. Membr. Sci. 543 (2017) 202-211.

[14] F. S. Pereira, E. Ribeiro deAzevedo, E. F. da Silva, T. J. Bonagamba, D. L. da Silva Agostini, A. Magalhaes, A. E. Job, E. R. P. Gonzalez, Study of the carbon dioxide chemical fixation-activation by guanidines, Tetrahedron 64 (2008) 10097-10106.

[15] T. Yamada, P. J. Lukac, T. Yu, R. G. Weiss, Reversible, room-temperature, chiral ionic liquids: Amidinium carbamates derived from amidines and amino-acid esters with carbon dioxide, Chem. Mater. 19 (2007) 4761-4768.

[16] D. J. Heldebrant, P. K. Koech, M. T. C. Ang, C. Liang, J. E. Rainbolt, C. R. Yonker, P. G. Jessop, Reversible zwitterionic liquids, the reaction of alkanol guanidines, alkanol amidines, and diamines with $CO_2$, Green Chemistry 12 (2010) 713-721.

[17] D. J. Heldebrant, C. R. Yonker, P. G. Jessop, L. Phan, Organic liquid $CO_2$ capture agents with high gravimetric $CO_2$ capacity, Energy Environ. Sci. 1 (2008) 487-493.

[18] D. Wu, Y. Han, W. Salim, K. K. Chen, J. Li, W. S. W. Ho, Hydrophilic and morphological modification of nanoporous polyethersulfone substrates for composite membranes in $CO_2$ separation, J. Membr. Sci. 565 (2018) 439-449.

The compositions, systems, and methods of the appended claims are not limited in scope by the specific compositions, systems, and methods described herein, which are intended as illustrations of a few aspects of the claims. Any compositions, systems, and methods that are functionally equivalent are intended to fall within the scope of the claims. Various modifications of the compositions, systems, and methods in addition to those shown and described herein are intended to fall within the scope of the appended claims. Further, while only certain representative compositions, systems, and method steps disclosed herein are specifically described, other combinations of the compositions, systems, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A membrane comprising:

a support layer; and a selective polymer layer disposed on the support layer, the selective polymer layer comprising a polymer matrix and a guanidine-based mobile carrier having a molecular weight of less than 1,000 Da dispersed within the polymer matrix.

2. The membrane of claim 1, wherein the guanidine-based mobile carrier comprises a compound defined by Formula I below Formula I

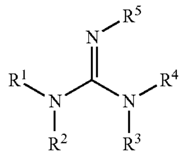

wherein $R^1$ and $R^2$ are each independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups, or $R^1$ and $R^2$, together with the N atom to which they are attached, form a 4-9 membered heterocycloalkyl group or a 5-6 membered heteroaryl group, each optionally substituted with 1, 2, or 3 independently selected $R^A$ groups;

$R^3$ and $R^4$ are each independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups, or $R^3$ and $R^4$, together with the N atom to which they are attached, form a 4-9 membered heterocycloalkyl group or a 5-6 membered heteroaryl group, each optionally substituted with 1, 2, or 3 independently selected $R^A$ groups;

$R^5$ is selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups; and each $R^A$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkyl, HO—$C_{1-3}$ alkyl, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$alkyl)aminosulfonyl, aminosulfonylamino, $C_{1-6}$ alkylaminosulfonylamino, di($C_{1-6}$alkyl)aminosulfonylamino, aminocarbonylamino, $C_{1-6}$ alkylaminocarbonylamino, and di($C_{1-6}$alkyl)aminocarbonylamino.

3. The membrane of claim 2, wherein $R^1$, $R^2$, $R^3$, and $R^4$ are all $C_{1-4}$ alkyl.

4. The membrane of any of claim 2, wherein $R^5$ is H.

5. The membrane of any of claim 2, wherein $R^5$ is $C_{1-6}$ alkyl optionally substituted with 1, 2, 3, or 4 independently selected $R^A$ groups.

6. The membrane of claim 5, wherein $R^5$ is $C_{1-6}$ alkyl substituted with an OH group.

7. The membrane of claim 5, wherein $R^5$ is $C_{1-6}$ alkyl substituted with an amino group.

8. The membrane of any of claim 1, wherein the guanidine-based mobile carrier comprises one of the following

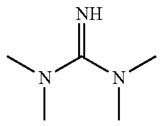

TMG

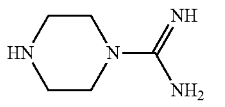

PZC

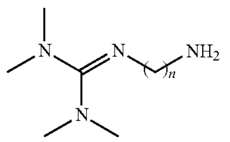

N-(alkylamine)TMG

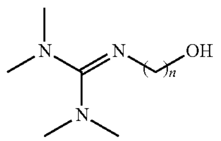

N-(alkanol)TMG wherein n is an integer from 1 to 12, such as from 1 to 6, TMG is tetramethyguanidine, and PZC is piperazine-1-carboximidamide.

9. The membrane of any of claim 1, wherein the polymer matrix comprises a hydrophilic polymer, an amine-containing polymer, or a combination thereof.

10. The membrane of claim 9, wherein the amine-containing polymer is selected from the group consisting of polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof.

11. The membrane of any of claim 1, wherein the selective polymer layer further comprises an amine-containing mobile carrier.

12. The membrane of claim 11, wherein the amine-containing mobile carrier comprises a salt of a primary amine or a salt of a secondary amine.

13. The membrane of any of claim 11, wherein the amine-containing mobile carrier comprises a salt selected from the group consisting of aminoisobutyric acid-potassium salt, aminoisobutyric acid-lithium salt, aminoisobutyric acid-piperazine salt, glycine-potassium salt, glycine-lithium salt, glycine-piperazine salt, dimethylglycine-potassium salt, dimethylglycine-lithium salt, dimethylglycine-piperazine salt, piperadine-2-carboxlic acid-potassium salt, piperadine-2-carboxlic acid-lithium salt, piperadine-2-carboxlic acid-piperazine salt, piperadine-4-carboxlic acid-potassium salt, piperadine-4-carboxlic acid-lithium salt, piperadine-4-carboxlic acid-piperazine salt, piperadine-3-carboxlic acid-potassium salt, piperadine-3-carboxlic acid-lithium salt, piperadine-3-carboxlic acid-piperazine salt, and blends thereof.

14. The membrane of any of claim 11, wherein the amine-containing mobile carrier comprises an amino acid salt.

15. The membrane of any of claim 14, wherein the amino acid salt comprises a glycinate salt, a sarcosinate salt, or an aminoisobutyrate salt.

16. The membrane of any of claim 1, wherein the selective polymer layer further comprises a $CO_2$-philic ether.

17. The membrane of any of claim 1, wherein the selective polymer layer further comprises a cross-linking agent.

18. The membrane of any of claim 1, wherein the selective polymer layer further comprises graphene oxide dispersed within the polymer matrix.

19. The membrane of any of claim 1, wherein the selective polymer layer further comprises carbon nanotubes dispersed within the polymer matrix.

20. A method for separating a first gas from a feed gas stream, the method comprising contacting a membrane defined by any of claim 1 with the feed gas stream comprising the first gas under conditions effective to afford transmembrane permeation of the first gas.

* * * * *